United States Patent
Shangguan et al.

(10) Patent No.: US 12,122,369 B2
(45) Date of Patent: Oct. 22, 2024

(54) ROUTE PROCESSING METHOD AND APPARATUS

(71) Applicant: Beijing Baidu Netcom Science Technology Co., Ltd., Beijing (CN)

(72) Inventors: Lantian Shangguan, Beijing (CN); Guibin Tian, Beijing (CN); Songtao Chang, Beijing (CN)

(73) Assignee: BEIJING BAIDU NETCOM SCIENCE TECHNOLOGY CO., LTD. (CN)

( * ) Notice: Subject to any disclaimer, the term of this patent is extended or adjusted under 35 U.S.C. 154(b) by 381 days.

(21) Appl. No.: 17/713,424

(22) Filed: Apr. 5, 2022

(65) Prior Publication Data

US 2023/0008289 A1    Jan. 12, 2023

(30) Foreign Application Priority Data

Jul. 12, 2021    (CN) .......................... 202110785825.9

(51) Int. Cl.
*B60W 30/09*    (2012.01)
*B60W 60/00*    (2020.01)
*G01C 21/34*    (2006.01)

(52) U.S. Cl.
CPC ........ *B60W 30/09* (2013.01); *B60W 60/0011* (2020.02); *G01C 21/3415* (2013.01); *B60W 2520/06* (2013.01); *B60W 2554/802* (2020.02)

(58) Field of Classification Search
CPC ........... G08G 1/0116; G08G 1/096791; G08G 1/166; G08G 1/167; B61L 23/34;
(Continued)

(56) References Cited

U.S. PATENT DOCUMENTS

2019/0317515 A1    10/2019    Zhang et al.
2020/0139959 A1*   5/2020    Akella ................ G05D 1/0088
(Continued)

FOREIGN PATENT DOCUMENTS

CN    109952241 A    6/2019
CN    110929702 A    3/2020
(Continued)

OTHER PUBLICATIONS

Xinxin et al., "HERMES: Pedestrian Real-Time Offline Positioning and Moving Trajectory Tracking System Based on MEMS Sensors," 2018, Publisher: IEEE.*
(Continued)

*Primary Examiner* — Tuan C To
(74) *Attorney, Agent, or Firm* — Dilworth IP, LLC

(57) ABSTRACT

The present disclosure provides a route processing method and apparatus. The solution includes: acquiring an initial traveling route, which includes a plurality of track points, corresponding to a vehicle; determining a vehicle traveling area, which includes an area where the vehicle is located when traveling to the track point, corresponding to each track point; determining at least one target track point in the plurality of track points according to the vehicle traveling area, where a first obstacle exists in the vehicle traveling area; performing updating processing on a position of each target track point in the initial traveling route respectively according to the position of the each target track point and a position of the first obstacle, and obtaining a target traveling route according to the target track point for which the updating processing has been performed; and controlling the vehicle to travel according to the target traveling route.

20 Claims, 12 Drawing Sheets

(58) Field of Classification Search
CPC ... G01S 13/93; B60W 30/09; B60W 60/0011; B60W 2554/802; B60W 2520/06; G01C 21/3415
USPC .......................................................... 701/26
See application file for complete search history.

(56) References Cited

U.S. PATENT DOCUMENTS

| | | | |
|---|---|---|---|
| 2020/0262448 A1* | 8/2020 | Li | B60W 30/18163 |
| 2022/0101019 A1* | 3/2022 | Cohen | G06V 20/56 |
| 2022/0126822 A1* | 4/2022 | Wang | B60W 30/0956 |

FOREIGN PATENT DOCUMENTS

| | | | | |
|---|---|---|---|---|
| CN | 111196271 A | | 5/2020 | |
| CN | 111867911 A | | 10/2020 | |
| CN | 111959497 A | * | 11/2020 | ............ B60W 10/20 |
| CN | 112955358 A | | 6/2021 | |
| EP | 2884476 A1 | | 6/2015 | |
| EP | 3667639 A1 | * | 6/2020 | ........ B60W 30/0953 |
| EP | 3819194 A2 | | 5/2021 | |
| JP | 6609237 B2 | | 11/2019 | |

OTHER PUBLICATIONS

Dengliang et al., "Position Tracking for Continuum Robots with Joint Limit Constraints," 2019, Publisher: IEEE.*
First Office Action in CN Patent Application No. 202110785825.9 dated Apr. 8, 2022.

* cited by examiner

ROUTE PROCESSING METHOD AND APPARATUS

CROSS-REFERENCE TO RELATED APPLICATIONS

This application claims priority to Chinese Patent Application No. 202110785825.9, filed on Jul. 12, 2021, which is hereby incorporated by reference in its entirety.

TECHNICAL FIELD

The present disclosure relates to the field of autonomous driving in computer technology, and in particular, to a route processing method and apparatus.

BACKGROUND

As the autonomous driving technology develops, currently in the process of autonomous driving, obstacles need to be avoided to ensure safe traveling for the vehicle.

Currently, in related arts, when obstacle-avoidance is performed, a vehicle traveling path is generally determined based on a path planning algorithm, and the obstacle-avoidance is achieved in the processing process of the path planning. However, the path planning algorithm generally has a large amount of computation, and at the same time, an autonomous driving system includes a plurality of processing units, and computing power resource allocated for respective processing units is limited.

Consequently, in a case of limited computing power resource, the large amount of computation of the current path planning algorithm will lead to an inability to ensure that a vehicle implements accurate and safe obstacle-avoidance.

SUMMARY

The present disclosure provides a route processing method and apparatus.

According to a first aspect of the present disclosure, a route processing method is provided, the method including:
  acquiring an initial traveling route corresponding to a vehicle, where the initial traveling route includes a plurality of track points;
  determining a vehicle traveling area corresponding to each track point, where the vehicle traveling area includes an area where the vehicle is located when the vehicle travels to the track point;
  determining at least one target track point in the plurality of track points according to the vehicle traveling area corresponding to each track point, where the vehicle traveling area corresponding to the target track point has a first obstacle existing therein;
  performing updating processing on a position of each target track point in the initial traveling route respectively according to the position of the at least one target track point and a position of the first obstacle corresponding to each target track point, and obtaining a target traveling route according to the target track point for which the updating processing has been performed; and
  controlling the vehicle to travel according to the target traveling route.

According to a second aspect of the present disclosure, an electronic device is provided, which includes:
  at least one processor; and
  a memory communicatively connected to the at least one processor; where the memory stores an instruction executable by the at least one processor, and the instruction is executed by the at least one processor to cause the at least one processor to execute the method according to the first aspect.

According to a third aspect of the present disclosure, a non-transitory computer-readable storage medium storing a computer instruction is provided, where the computer instruction is used to cause a computer to execute the method according to the first aspect.

It should be understood that, the content described in this part is not intended to identify key or importance features of the embodiments of the present disclosure, nor is used to limit the scope of the present disclosure. Other features of the present disclosure will become easy to be understood according to the following description.

BRIEF DESCRIPTION OF DRAWINGS

The accompanying drawings are for better understanding of the present solution, and do not constitute limitation to the present disclosure, where.

DESCRIPTION OF EMBODIMENTS

The following description of illustrative embodiments of the present disclosure will be made with reference to the accompanying drawings, which include various details of the embodiments of the present disclosure to facilitate understanding, and they should be regarded as illustrative only. Therefore, those of ordinary skills in the art should realize that various changes and modifications can be made to the embodiments described herein without departing from the scope and spirit of the present disclosure. Similarly, for clarity and conciseness, descriptions of well-known functions and structures are omitted in the following description.

In order to better understand the technical solution of the present disclosure, the related technologies involved in the present disclosure are further described in detail below.

With the continuous development of science and technology, autonomous driving technology is becoming more and more mature. Vehicles operating in an autonomous driving mode can liberate passengers, especially drivers, from some driving-related duties.

It could be understood that, in the process of autonomous driving, in order to ensure the safety of vehicle driving, it is necessary to avoid obstacles in the road. At present, in the related technologies, when obstacle-avoidance is being implemented, a vehicle traveling path is generally determined by a corresponding path planning algorithm, and the obstacle-avoidance is implemented in the process of path planning, so as to ensure that a collision with an obstacle will not occur in the planned vehicle traveling path.

However, the amount of computation of the path planning algorithm is relatively large, and at the same time, an autonomous driving system will include a plurality of processing units, such as a sensing unit, a positioning unit, a control unit, and each processing unit is allocated with limited computing power resource. In the case of limited computing power resource, the current path planning algorithm will also consume more computing power resource because of its large amount of computation, which will lead to an inability to ensure that a vehicle implements accurate and safe obstacle-avoidance.

Aiming at the problems in the prior arts, the present disclosure provides the following technical concept: firstly, positions of obstacles are not considered when determining a vehicle traveling track, and then, after the vehicle traveling track is determined, respective track points in the vehicle traveling track are moved according to the positions of obstacles in the road to avoid the obstacles, so as to implement obstacle avoidance, and thus real-time obstacle-avoidance of the vehicle can be realized simply and effectively, thereby ensuring accurate and safe obstacle-avoidance on the basis of effective computing power resource.

Figure 1:
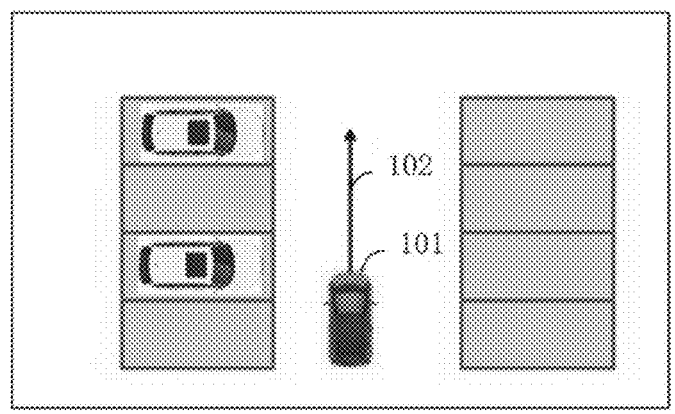
FIG. 1 is a schematic diagram of route learning of automatic parking provided by an embodiment of the present disclosure.
Figure 2:
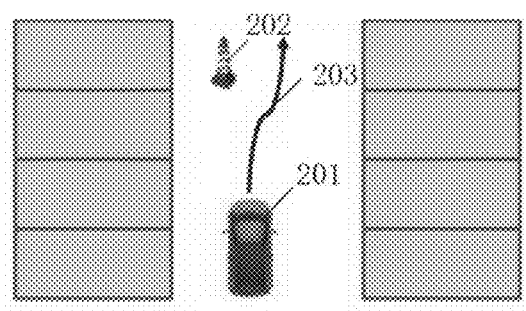
FIG. 2 is a first schematic diagram of an obstacle in a traveling route provided by an embodiment of the present disclosure.
Figure 3:
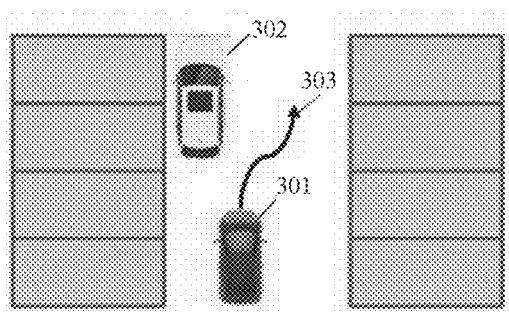
FIG. 3 is a second schematic diagram of an obstacle in the traveling route provided by an embodiment of the present disclosure.
Figure 4:
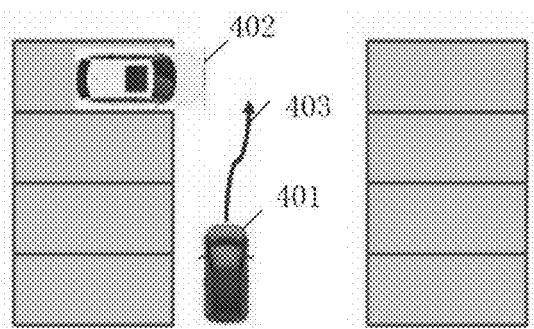
FIG. 4 is a third schematic diagram of an obstacle in the traveling route provided by an embodiment of the present disclosure.

An application scenario of a route processing method of the present disclosure will be described below with reference to FIG. 1 to FIG. 4 by taking a specific automatic parking scenario as an example. FIG. 1 is a schematic diagram of route learning of automatic parking provided by an embodiment of the present disclosure; FIG. 2 is a first schematic diagram of an obstacle in a traveling route provided by an embodiment of the present disclosure; FIG. 3 is a second schematic diagram of an obstacle in the traveling route provided by an embodiment of the present disclosure; FIG. 4 is a third schematic diagram of an obstacle in the traveling route provided by an embodiment of the present disclosure.

The scenario of automatic parking will be briefly introduced first, where the automatic parking refers to that a vehicle travels to a target parking space under an autonomous driving mode, and the automatic parking can be divided into two stages, one is a cruise stage, and the other is a parking stage. In the cruise stage, the vehicle needs to travel from a current position to a position of the target parking space, and then in the parking stage, the vehicle will park itself into the target parking space.

It could be understood that, in the cruise stage of the automatic parking, the vehicle actually autonomously drives in some complex scenarios of a parking lot, and in this process, the vehicle needs to perform obstacle-avoidance processing to ensure safe traveling of the vehicle.

In a possible implementation, before the vehicle performs automatic parking, the vehicle will firstly learn a route from a start point to the target parking space, where the start point may be, for example, an entry of an apartment complex, an entry of a mall, etc. A current start point may depend on a position from which a user wants the vehicle to start automatic parking, and the present embodiment does not limit the specific implementation of the start point and the target parking space.

For example, the vehicle may be driven by the user from the start point to the target parking space, and the vehicle learns the route in this process; or route data can be directly input to the vehicle, so that the vehicle determines the traveling route to be learnt.

For example, referring to FIG. 1, the scenario shown by FIG. 1 is a scenario of a parking lot, and at least one vehicle can be parked in the parking lot. A vehicle 101 in FIG. 1 is an autonomous driving vehicle, where a route 102 is the route that is learnt by the autonomous driving vehicle.

When no obstacle exists in this route, the vehicle can perform autonomous driving according to this route to arrive at the target parking space. However, a circumstance of the parking lot is usually complex and uncontrollable, thus obstacles may appear in this route, and when an obstacle appears, the vehicle needs to perform obstacle-avoidance processing.

For example, reference may be made to FIG. 2 for understanding. As shown in FIG. 2, a current vehicle 201 is performing cruise of automatic parking according to a learnt route in the parking lot, but a roadblock 202 exists in the learnt route as shown in FIG. 2, and the roadblock 202 here is taken as an obstacle. The vehicle needs to perform obstacle-avoidance processing to this obstacle, for example, the vehicle may travel according to a route 203 as shown in FIG. 2 to avoid the obstacle 202.

For another example, reference may be made to FIG. 3 for understanding. As shown in FIG. 3, when a current vehicle 301 is performing cruise of automatic parking according to a learnt route in the parking lot, a vehicle 302 as shown in FIG. 3 exists in the learnt route, and the vehicle 302 here is taken as an obstacle. The vehicle needs to perform obstacle-avoidance processing to this obstacle, for example, the vehicle may travel according to a route 303 as shown in FIG. 3 to avoid the obstacle 302.

For another example, reference may be made to FIG. 4 for understanding. As shown in FIG. 4, when a current vehicle 401 is performing cruise of the automatic parking according to a learnt route in the parking lot, an obstacle 402 as shown in FIG. 4 exists in the learnt route, where the obstacle 402 is a head of a vehicle protruding from a parking space on a side of the road. The vehicle needs to perform obstacle-avoidance processing to this obstacle, for example, the vehicle may travel according to a route 403 as shown in FIG. 4 to avoid the obstacle 402.

The above FIG. 2 to FIG. 4 illustrate possible circumstances of obstacles, and in actual implementation processes, obstacle-avoidance processing needs to be performed for circumstances of obstacles such as a vehicle head protruding from a parking space on a side of the road, a pillar/wall invading into a vehicle lane, a cone barrel inside/outside a curve road, a pillar, a wall, a vehicle, etc. It could be understood that, all objects that obstruct the vehicle from passing through may be understood as an obstacle, to all of which the vehicle needs to perform obstacle-avoidance processing, and the present disclosure does not limit the specific implementation of the obstacles.

Schematic diagrams of obstacle-avoidance in an automatic parking scenario are described above with reference to FIG. 1 to FIG. 4. It could be understood that, under scenarios such as city roads, highways, etc., the implementation for the vehicle to perform autonomous driving is the same, and obstacle-avoidance processing needs to be performed in the process of autonomous driving, and the present embodiment does not describe other scenarios in detail, and the implementation thereof is similar to the automatic parking scenario described above.

In the following, the route processing method provided by the embodiments of the present disclosure will be introduced in detail with specific embodiments. It is worth to be noted that the executing subject of each embodiment of the disclosure may be, for example, a processor in a vehicle, or a server in a cloud, etc., which is not limited by the present embodiment, and it may be selected according to actual needs, as long as the route processing method in the present disclosure can be implemented.

Figure 5:
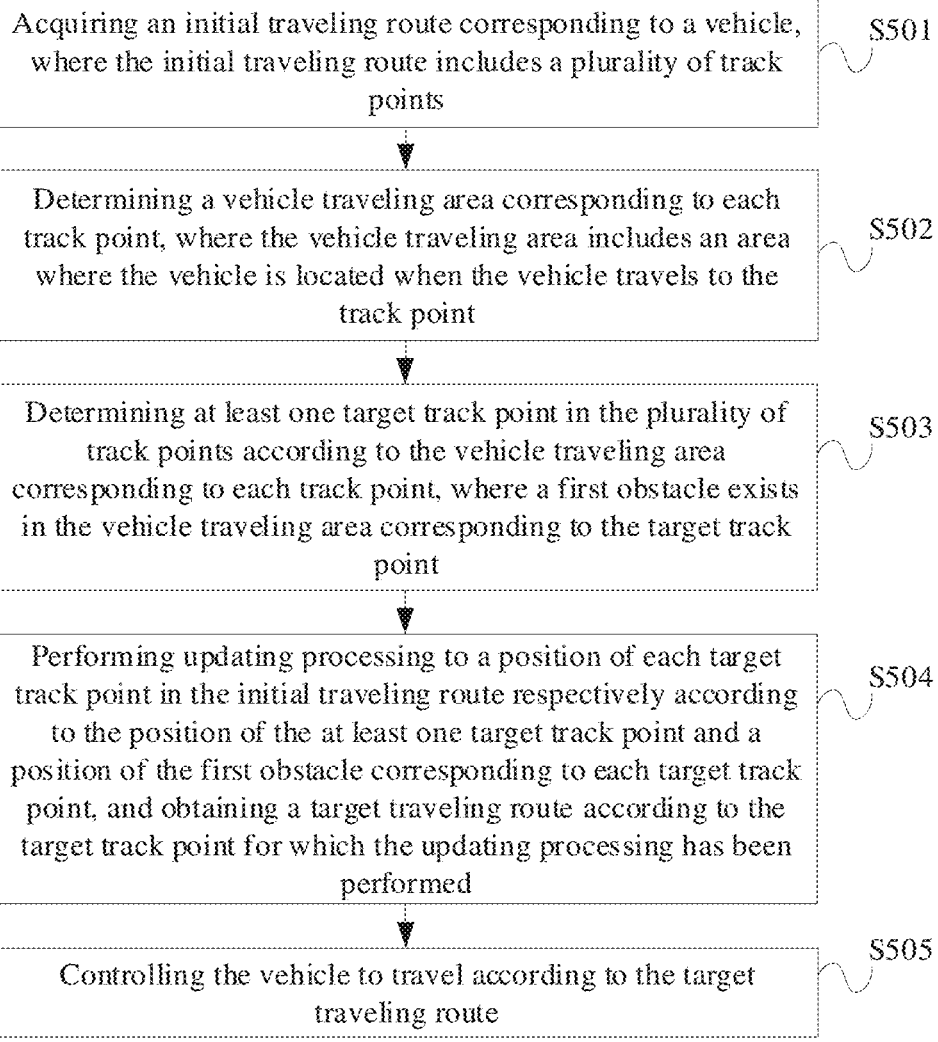
FIG. 5 is a flowchart of a route processing method provided by an embodiment of the present disclosure.

Firstly, reference is made to FIG. 5 for describing. FIG. 5 is a flowchart of a route processing method provided by an embodiment of the present disclosure.

As shown in FIG. 5, the method includes:

S501, acquiring an initial traveling route corresponding to a vehicle, where the initial traveling route includes a plurality of track points.

In the present embodiment, an initial traveling route corresponding to the vehicle exists, and a plurality of track points may be included in the initial traveling route, where a number, a density, etc., of the track points may be selected according to actual needs, which is not limited by the present embodiment.

In a possible implementation, under a scenario of automatic parking, the initial traveling route corresponding to the vehicle may be, for example, the learnt route of the vehicle described in the above embodiment, then, for example, the initial traveling route corresponding to the vehicle may be directly acquired from a storage unit.

Alternatively, under an autonomous driving scenario on the road, the initial traveling route of the vehicle may also be, for example, a route planned according to a start point and an end point, and then the initial traveling route corresponding to the vehicle may be acquired through route planning. The specific implementation of the initial traveling route corresponding to the vehicle is not limited by the present embodiment, which may be selected according to actual needs.

It could be understood that, the initial traveling route in the present embodiment does not consider avoidance of an obstacle, thus the amount of computation to acquire the initial traveling route corresponding to the vehicle is relatively small.

S502, determining a vehicle traveling area corresponding to each track point, where the vehicle traveling area includes an area where the vehicle is located when the vehicle travels to the track point.

In the present embodiment, a plurality of track points may be included in the initial traveling route, and each track point may correspond to a vehicle traveling area, where the vehicle traveling area may include an area where the vehicle is located when the vehicle travels to the track point.

It could be understood that, each track point corresponds to its respective position information used for indicating at which position the vehicle is specifically located when the vehicle travels to the track point. At the same time, as the vehicle is an object has a certain volume, when the vehicle travels to a track point, it occupies an area instead of a point, and thus the vehicle traveling area corresponding to each track point can be determined.

It is worth to be noted that, a vehicle traveling to a track point may refer to that a certain part of the vehicle travels to the track point, which may be, for example, the head of the vehicle travels to the track point, or may also be the tail of the vehicle travels to the track point, or may also be a center of the vehicle travels to the track point, and the present embodiment does not put a limitation on this.

S503, determining at least one target track point in the plurality of track points according to the vehicle traveling area corresponding to each track point, where the vehicle traveling area corresponding to the target track point has a first obstacle existing therein.

After vehicle traveling areas corresponding to respective track points are determined respectively, at least one target track point may be determined in the plurality of track points according to the vehicle traveling area corresponding to each track point. The target track point in the present embodiment may be understood as, for example, a track point to which the vehicle needs to perform obstacle-avoidance processing.

It could be understood that, the vehicle traveling area corresponding to each track point includes the area where the vehicle is located when the vehicle travels to the track point, then when an obstacle exists in the vehicle traveling area corresponding to a certain track point, it represents that a risk of collision between the vehicle and the obstacle exists at this track point, then the vehicle needs to perform obstacle-avoidance processing at this track point, thus the first obstacle exists in the vehicle traveling area corresponding to the target track point in the present embodiment.

The first obstacle may be, for example, the roadblock and the vehicle as described above, or the protruding vehicle head as described above. That is to say, the first obstacle in the present embodiment may be an entire object, or a part of an entire object, which is not limited by the present embodiment. All objects that obstruct the vehicle from passing through in the road may be determined as the first obstacle in the present embodiment.

S504, performing updating processing on a position of each target track point in the initial traveling route respectively according to the position of the at least one target track point and a position of the first obstacle corresponding to each target track point, and obtaining a target traveling route according to the target track point for which the updating processing has been performed.

After the target track point is determined, the obstacle-avoidance processing needs to be performed for respective target track points, to avoid collision of the vehicle with the obstacle at the target track points. In a possible implementation, a position of the target track point may be updated according to the position of the target track point and the position of the first obstacle corresponding to the target track point, and a position of an updated target track point may satisfy, for example: the first obstacle does not exist in the vehicle traveling area corresponding to the updated target track point, that is, when the vehicle travels to the position corresponding to the updated target track point, the vehicle will not collide with the first obstacle, so that the obstacle-avoidance at the target track point is achieved.

After the updating processing is performed on positions of respective target track points, a target traveling route may be determined according to the target track points for which the updating processing has been performed, and the target track points for which the updating processing has been performed are included in the target traveling route.

In a possible implementation, in order to ensure stable traveling of the vehicle, for example, smoothing processing may also be performed, according to the position of the updated target track point, on respective track points which are not updated, so as to determine respective track points on which the smoothing processing has been performed, then, for example, respective track points on which the smoothing processing has been performed, and the respective updated target track points are included in the target traveling route.

Alternatively, a route consisted of the respective updated target track points and respective track points for which the updating processing is not performed in the initial traveling route may be directly determined as the target traveling route, and in this way computation resource can be saved to some extent. The specific implementation of determining the target traveling route is not limited by the present embodiment, as long as the target traveling route includes the respective updated target track points.

S505, controlling the vehicle to travel according to the target traveling route.

After the target traveling route is determined, the vehicle can be controlled to travel according to the target traveling route. Since obstacle-avoidance processing to the obstacle has already been implemented in the target traveling route, avoidance of the obstacle can be effectively implemented in the process that the vehicle travels according to the target traveling route, thereby ensuring safe and stable traveling of the vehicle.

The route processing method provided by the embodiment of the present disclosure includes: acquiring an initial traveling route corresponding to a vehicle, where the initial traveling route includes a plurality of track points; determining a vehicle traveling area corresponding to each track point, where the vehicle traveling area includes an area where the vehicle is located when the vehicle travels to the track point; determining at least one target track point in the plurality of track points according to the vehicle traveling area corresponding to each track point, where a first obstacle exists in the vehicle traveling area corresponding to the target track point; performing updating processing on a position of each target track point in the initial traveling route respectively according to the position of the at least one target track point and a position of the first obstacle corresponding to each target track point, and obtaining a target traveling route according to the target track point for which the updating processing has been performed; and controlling the vehicle to travel according to the target traveling route. The target track point of which the vehicle traveling area overlaps with the obstacle is determined from the plurality of track points included in the initial traveling route, then the updating processing is performed on the position of the target track point according to the position of the target track point and the position of the corresponding first obstacle, to implement avoidance of the obstacle at the target track point. Then the target traveling route is determined according to the target track point for which the updating processing has been performed. The obstacle is not considered when the initial traveling route is determined, and then the obstacle-avoidance processing is easily and effectively implemented based on the above procedure, so that the amount of computation for determining the vehicle traveling route is effectively reduced, and it is ensured that the vehicle implements accurate and safe obstacle-avoidance in the case of limited computing power resource.

Figure 6:
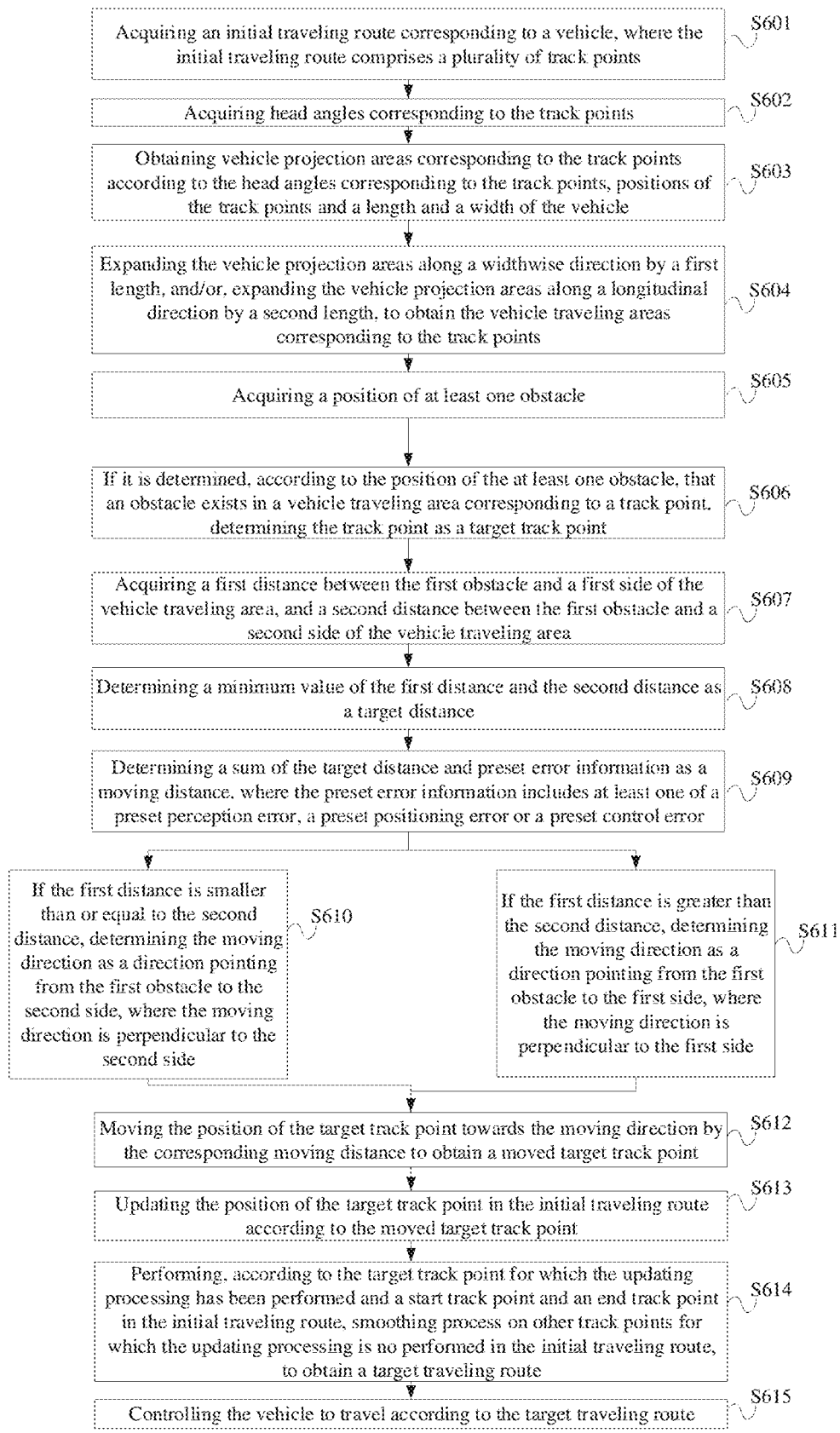
FIG. 6 is a second flowchart of the route processing method provided by an embodiment of the present disclosure.
Figure 7:
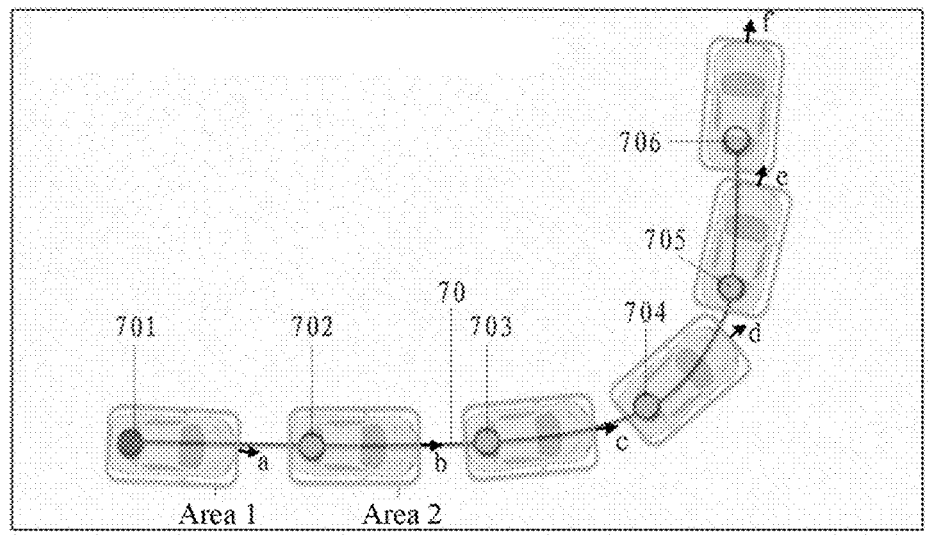
FIG. 7 is a schematic diagram of an initial traveling route provided by an embodiment of the present disclosure.
Figure 8:
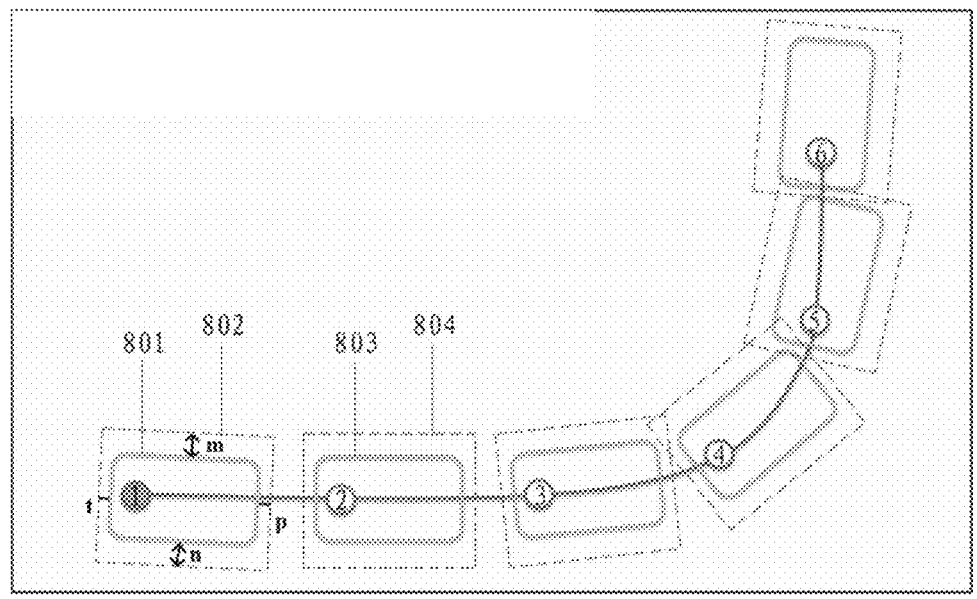
FIG. 8 is a schematic implementation diagram of expanding a vehicle projection area provided by an embodiment of the present disclosure.
Figure 9:
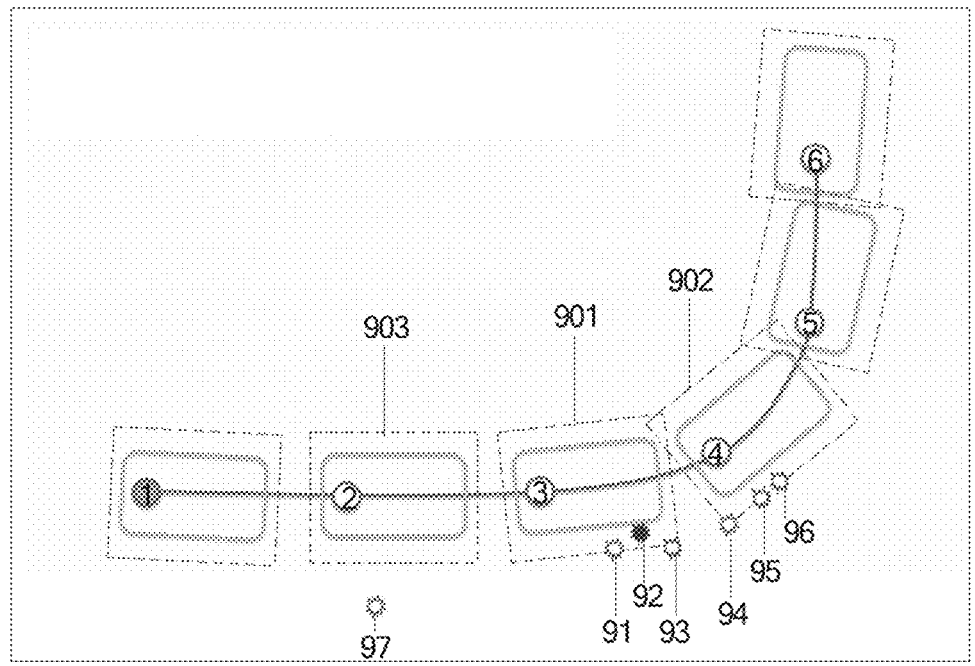
FIG. 9 is a schematic implementation diagram of obstacles in vehicle traveling areas provided by an embodiment of the present disclosure.
Figure 10:
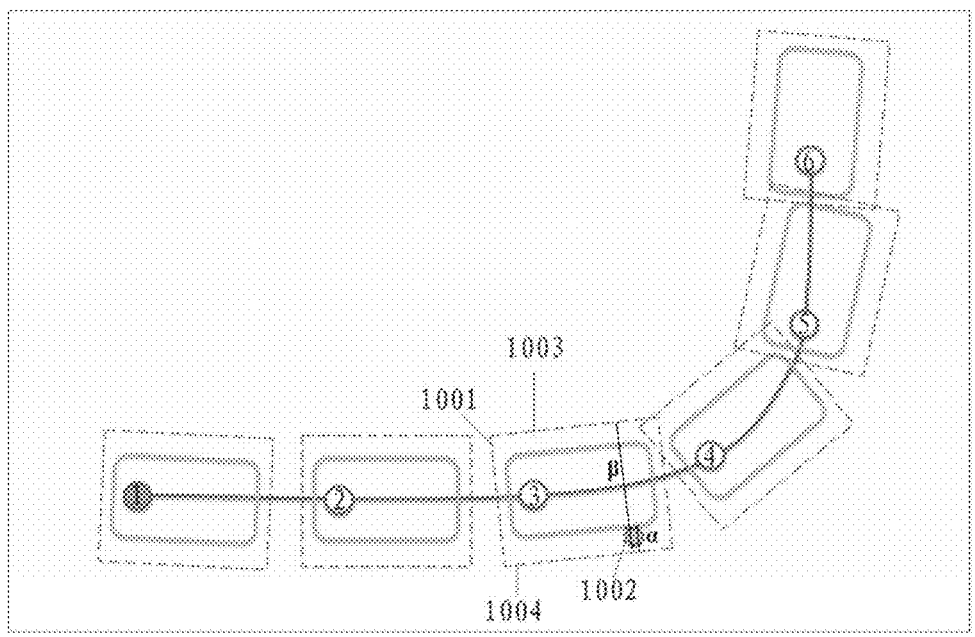
FIG. 10 is a schematic implementation diagram of a distance between a first obstacle and a side of the vehicle traveling area provided by an embodiment of the present disclosure.
Figure 11:
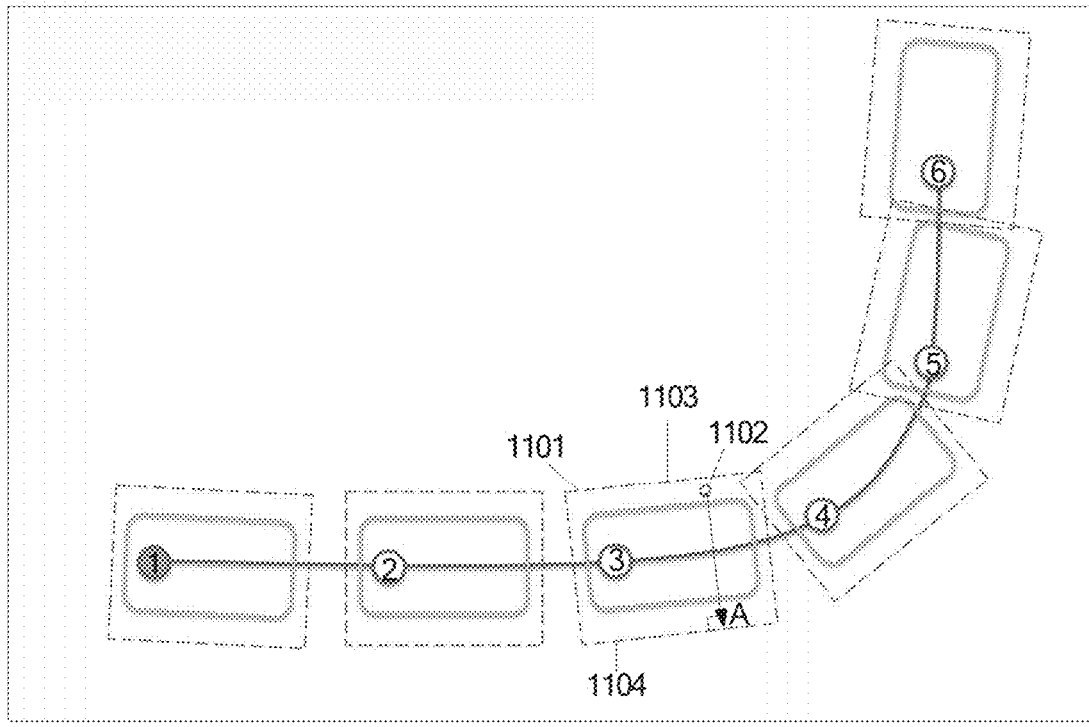
FIG. 11 is a first schematic implementation diagram of determining a moving direction provided by an embodiment of the present disclosure.
Figure 12:
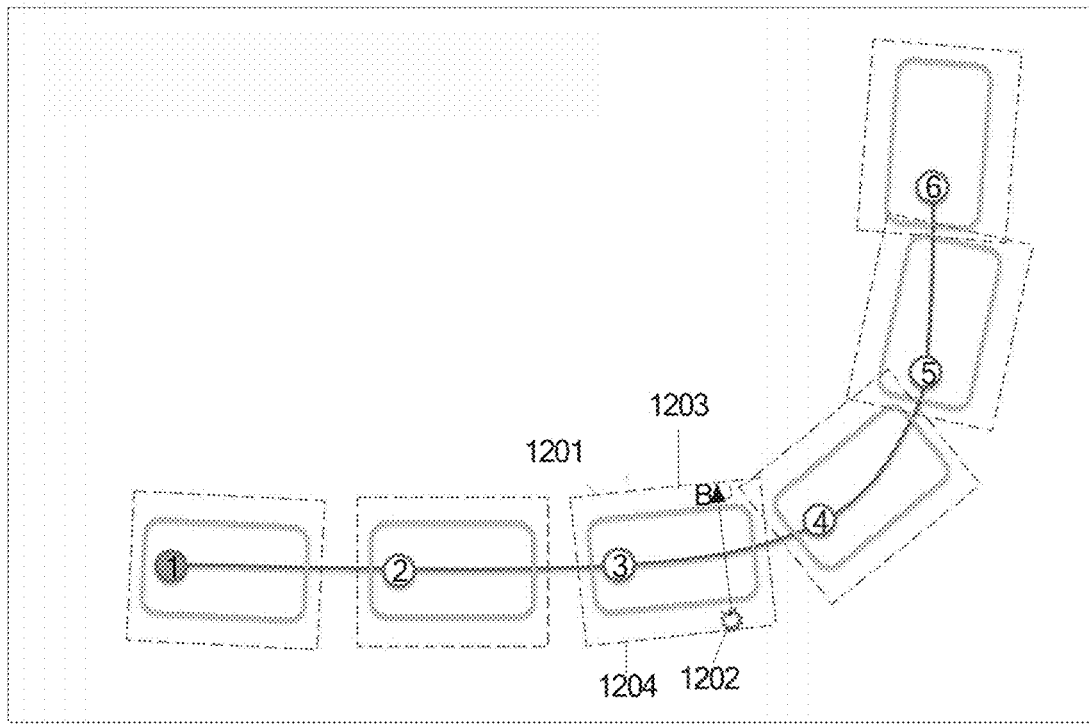
FIG. 12 is a second implementation schematic diagram of determining a moving direction provided by an embodiment of the present disclosure.
Figure 13:
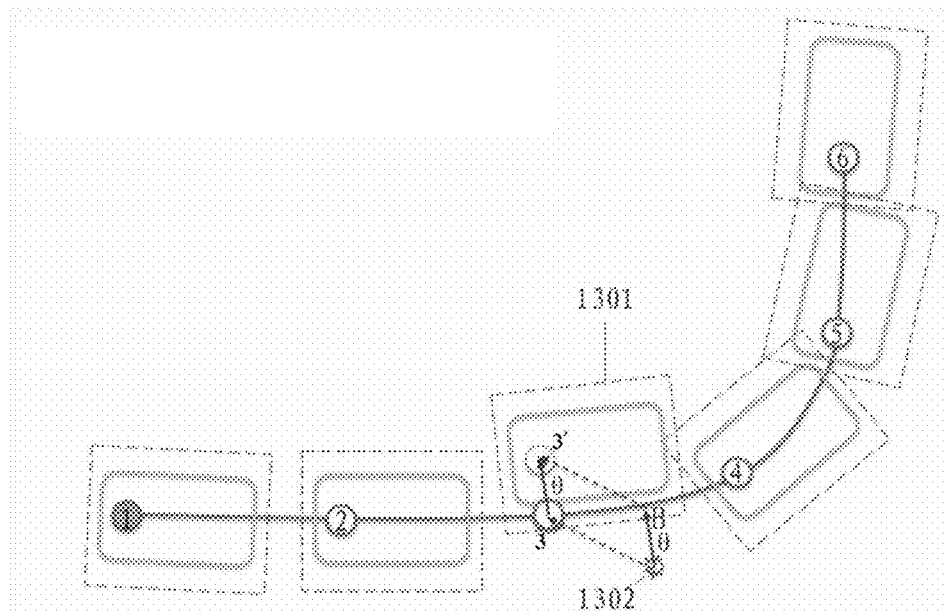
FIG. 13 is a schematic implementation diagram of moving a target track point provided by an embodiment of the present disclosure.
Figure 14:
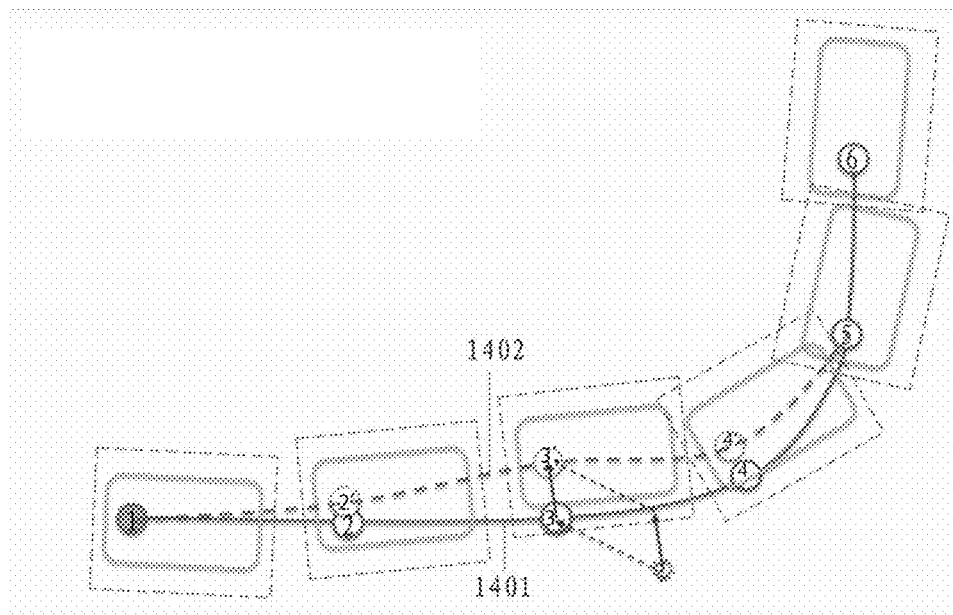
FIG. 14 is a schematic implementation diagram of smoothing processing provided by an embodiment of the present disclosure.

On the basis of the above embodiment, the following will further describe the route processing method provided by the present disclosure with reference to FIG. 6 to FIG. 14 in detail. FIG. 6 is a second flowchart of the route processing method provided by an embodiment of the present disclosure; FIG. 7 is a schematic diagram of an initial traveling route provided by an embodiment of the present disclosure; FIG. 8 is an implementation schematic diagram of expanding a vehicle projection area provided by an embodiment of the present disclosure; FIG. 9 is a schematic implementation diagram of obstacles in vehicle traveling areas provided by an embodiment of the present disclosure; FIG. 10 is a schematic implementation diagram of a distance between a first obstacle and a side of the vehicle traveling area provided by an embodiment of the present disclosure; FIG. 11 is a first schematic implementation diagram of determining a moving direction provided by an embodiment of the present disclosure; FIG. 12 is a second schematic implementation diagram of determining a moving direction provided by an embodiment of the present disclosure; FIG. 13 is a schematic implementation diagram of moving a target track point provided by an embodiment of the present disclosure; and FIG. 14 is a schematic implementation diagram of smoothing processing provided by an embodiment of the present disclosure.

As shown in FIG. 6, the method includes:

S601, acquiring an initial traveling route corresponding to a vehicle, where the initial traveling route includes a plurality of track points.

The implementation of S601 is similar to that of S501, and on the basis of the above content; for example, the initial traveling route and the track point can be further understood with reference to FIG. 7.

As shown in FIG. 7, for example, the initial traveling route currently acquired corresponding to a vehicle is a route indicated by 70 in FIG. 7. The initial traveling route 70 includes a plurality of track points, such as a track point 701, a track point 702, a track point 703, a track point 704, a track point 705, a track point 706 as shown in FIG. 7.

Referring to FIG. 7, each track point corresponds to a position thereof, where a position of a track point is used to indicate a position where the vehicle is located when the vehicle travels to the track point.

S602, acquiring head angles corresponding to the track points.

In the present embodiment, in addition to that each track point corresponds to the position thereof, each track point also corresponds to a head angle thereof, where the head angle may be understood as, for example, a heading angle of the vehicle, and the heading angle of the vehicle generally refers to an angle between a velocity of a centroid of mass of the vehicle and a horizontal axis under a ground coordinate system.

For example, it may be understood with reference to FIG. 7 that, for example, for the track point 701, its corresponding head angle is an angle indicated by arrow a, and for the track point 702, its corresponding head angle is an angle indicated by arrow b, and for the track point 703, its corresponding head angle is an angle indicated by arrow c, and for the track point 704, its corresponding head angle is an angle indicated by arrow d, and for the track point 705, its corresponding head angle is an angle indicated by arrow e, and for the track point 706, its corresponding head angle is an angle indicated by arrow f.

It can be determined with reference to FIG. 7 that, each track point corresponds to a position and a head angle respectively, according to which a position and attitude of the vehicle at the respective track points can be determined, where the position and attitude include a position and an attitude.

S603, obtaining vehicle projection areas corresponding to the track points according to the head angles corresponding to the track points, positions of the track points and a length and a width of the vehicle.

It can be known according to the above description that vehicle traveling areas corresponding to the respective track points need to be determined. In a possible implementation, for example, vehicle projection areas corresponding to the respective track points may be determined first according to the head angles corresponding to the track points, the positions of the track points and the length and the width of the vehicle.

Referring to FIG. 7, the position and attitude of the vehicle at a track point may be determined according to the head angle corresponding to the track point and the position of the track point, and then the vehicle projection area may be determined according to the position and attitude of the vehicle at the track point and the length and the width of the vehicle, where the vehicle projection area may be understood as an area obtained by projecting the vehicle to the ground after the vehicle maintains the position and attitude indicated by the position and the angle corresponding to the track point.

For example, the vehicle projection area corresponding to the track point 701 in FIG. 7 is an area 1, the vehicle projection area corresponding to the track point 702 is an area 2, and the vehicle projection areas corresponding to other respective track points have similar implementations, which can be understood with reference to FIG. 7 and will not be repeated here.

S604, expanding the vehicle projection areas along a widthwise direction by a first length, and/or, expanding the vehicle projection areas along a longitudinal direction by a second length, to obtain the vehicle traveling areas corresponding to the track points.

The vehicle projection areas determined above are projection areas corresponding to a real vehicle, but in an actual implementation process, in order to reserve a certain tolerance range, the vehicle projection areas will be expanded to some extend to obtain the vehicle traveling areas corresponding to the track points.

In a possible implementation, the vehicle projection area may be expanded along the widthwise direction by the first length, and/or, the vehicle projection area may be expanded along the longitudinal direction by the second length, so as to realize expansion of the vehicle projection area, thereby obtaining the vehicle traveling area corresponding to the track point, where the specific implementation of the first length and the second length may be selected according to actual needs, which is not limited by the present embodiment.

For example, obtaining the vehicle traveling areas according to the vehicle projection areas may be understood with reference to FIG. 8. Referring to FIG. 8, assuming that a vehicle projection area 801 currently corresponding to a track point 1 is expanded in the widthwise direction by m+n as shown in FIG. 8, and is expanded in the longitudinal direction by t+p as shown in FIG. 8, so as to obtain a vehicle traveling area 802 corresponding to the track point 1, where m, n, t and p are figures greater than or equal to 0.

In addition, a vehicle projection area 803 corresponding to a track point 2 may be expanded in the widthwise direction and the longitudinal direction, so as to obtain a vehicle traveling area 804 corresponding to the track point 2. The implementations for track point 3, track point 4, track point 5 and track point 6 of the areas are similar and will not be repeated here.

It can be known that, the vehicle projection areas corresponding to the track points are expanded to obtain the vehicle traveling areas corresponding to the track points, where the vehicle traveling areas are actually larger than the area actually occupied by the vehicle, and in such a way, a tolerant distance can be reserved in an actual processing process, so that the performance and safety of the obstacle-avoidance processing can be effectively improved.

In an actual implementation process, when a vehicle projection area is expanded to obtain a vehicle traveling area, for example, the vehicle projection area may be expanded along the widthwise direction by the first length, and expanded along the longitudinal direction by the second length, or only expanded along the widthwise direction, or only expanded along the longitudinal direction. At the same time, the expanded range is not necessarily a rectangular range, it may also be, for example, a sector range, a circular range, a polygon range, or a range of an irregular shape, etc., which is not limited by the present embodiment, as long as the vehicle projection area is expanded.

S605, acquiring a position of at least one obstacle.

After the vehicle traveling areas corresponding to the respective track points are determined respectively, a track point corresponding to a vehicle traveling area in which an obstacle exists may be determined as a target track point.

For example, the position of the obstacle in the road may be first obtained, and then the target track point is determined according to the position of the obstacle. In a possible implementation, for example, the position of the obstacle in the road may be determined by a perception module in an autonomous driving system.

S606, if it is determined, according to the position of the at least one obstacle, that an obstacle exists in a vehicle traveling area corresponding to a track point, determining the track point as a target track point.

When determining the target track point, for example, if it is determined, according to the position of the acquired at least one obstacle, that an obstacle exists in a vehicle traveling area corresponding to a track point, the track point can be determined as the target track point.

For example, reference is made to FIG. 9 for understanding. As shown in FIG. 9, for example, an obstacle 91, an obstacle 92, an obstacle 93, an obstacle 94, an obstacle 95, an obstacle 96 and an obstacle 97 currently exist as shown in FIG. 9, where each obstacle corresponds to its position respectively, then the target track point can be determined according to the positions of the respective obstacles and the vehicle traveling areas corresponding to the respective track points.

As shown in FIG. 9, the obstacle 91, the obstacle 92 and the obstacle 93 exist in a vehicle traveling area 901 corresponding to a track point 3, then the track point 3 can be determined as a target track point. The obstacle 94, the obstacle 95 and the obstacle 96 exist in a vehicle traveling area 902 corresponding to a current track point 4, then the track point 4 can be determined as a target track point.

At the same time, as shown in FIG. 9, it can be determined that the obstacle 97 exists nearby the vehicle traveling area 903 corresponding to the track point 2, but the obstacle 97 is not in the vehicle traveling area 903 corresponding to the track point 2, thus the obstacle 97 will not obstruct the vehicle from passing through, thus it is not necessary to perform the obstacle-avoidance processing to the obstacle 97, and it is not necessary to determine the track point 2 as a target track point, thus in the scenario shown in FIG. 9, the track point 3 and the track point 4 will be determined as target track points.

In the present embodiment, the first obstacle exists in the vehicle traveling area corresponding to the target track point. In another possible implementation, the first obstacle is an obstacle closest to a longitudinal middle axis of the vehicle traveling area. For example, reference can made to FIG. 9 for understanding. For example, for the track point 3 in FIG. 9, the obstacle 91, the obstacle 92 and the obstacle 93 exist in the corresponding vehicle traveling area 901.

It can be determined based on FIG. 9 that the obstacle 92 is closest to the longitudinal middle axis of the vehicle traveling area 901, where the obstacle 92 can be understood as the most dangerous obstacle. Then as long as the vehicle avoided the obstacle 92 at the position corresponding to the track point 3, it can certainly avoid the obstacle 91 and the obstacle 93 as well, then the obstacle 92 can be determined as the first obstacle corresponding to the track point 3, and then the obstacle-avoidance processing is performed based on the first obstacle.

That is, the vehicle traveling area corresponding to the target track point may include at least one obstacle in the present embodiment, then the obstacle having the shortest distance to the longitudinal middle axis of the vehicle traveling area is determined as the first obstacle in the at least one obstacle included in the vehicle traveling area corresponding to the target track point.

The first obstacle is determined in the at least one obstacle included in the vehicle traveling area, and then the obstacle-avoidance processing is implemented based on the first obstacle, so as to safely and effectively implement avoidance of all obstacles, and at the same time effectively reduce the amount of computation of the obstacle-avoidance.

S607, acquiring a first distance between the first obstacle and a first side of the vehicle traveling area, and a second distance between the first obstacle and a second side of the vehicle traveling area.

After the respective target track points and first obstacles corresponding to the respective target track points are determined, the positions of the target track points can be updated based on the positions of the first obstacles, so as to achieve the obstacle-avoidance at the target track points. When updating the position of a target track point, specifically, the position of the target track point is moved, so a moving distance and a moving direction need to be determined.

The implementation for determining the moving distance is introduced first here. In the present embodiment, the vehicle traveling area has two corresponding sides, for example, which are represented as a first side and a second side, then a first distance between the first obstacle and the first side of the corresponding vehicle traveling area and a second distance between the first obstacle and the second side of the vehicle traveling area can be acquired.

For example, reference may be made to FIG. 10 for understanding. As shown in FIG. 10, assuming that the current track point 3 is the target track point, and a first obstacle 1002 is included in a vehicle traveling area 1001 corresponding to the target track point 3.

The vehicle traveling area 1001 has two sides, which are the first side indicated by 1003 and the second side indicated by 1004 respectively, and then distances between the obstacle to the two sides can be acquired. In a possible implementation, a purpose of determining the distances between the obstacle and the sides is to avoid the obstacle, thus the distance acquired in the present embodiment is a distance between a side and an edge of the obstacle far from the side.

Reference can be made to FIG. 10 for understanding. The current first distance between the obstacle 1002 and the first side 1003 is a distance 13 between a lower edge of the obstacle 1002 and the first side 1003, where the lower edge of the obstacle 1002 is an edge farther to the first side 1003; and the current second distance between the obstacle 1002 and the second side 1004 is a distance $\alpha$ between an upper edge of the obstacle 1002 and the second side 1004, where the upper edge of the obstacle 1002 is an edge farther to the second side 1004.

S608, determining a minimum value of the first distance and the second distance as a target distance.

After the first distance between the first obstacle and the first side and the second distance between the first obstacle and the second side are determined, the minimum value in the first distance and the second distance is determined as the target distance.

It could be understood that, the current target distance is a basic distance that the target track point needs to be moved, actually the first obstacle can be avoided both by moving the target track point towards a direction away from the first obstacle corresponding to the first side by at least the first distance, or moving the target track point towards a direction away from the first obstacle corresponding to the second side by at least the second distance, however, to ensure the traveling route of the vehicle is as stable as possible, the minimum value in the first distance and the second distance is selected and determined as the target distance in the present embodiment, so as to reduce change of the vehicle route, thereby ensuring stable traveling of the vehicle.

S609, determining a sum of the target distance and preset error information as a moving distance, where the preset error information includes at least one of a preset perception error, a preset positioning error or a preset control error.

After the vehicle is moved by the target distance in the present embodiment, theoretically the obstacle-avoidance can be realized, but in the processing procedure of the autonomous driving, respective processing units will have a certain error, thus the preset error information may be added to the target distance to obtain a distance which is determined as the moving distance.

The preset error information may include, for example, the preset perception error, the preset positioning error and the preset control error, where the preset perception error may be understood as an error of a perception unit, for example, an error exists when the perception unit performs obstacle perception; and the preset positioning error may be understood as an error of a positioning unit, for example, an error exists when the positioning unit locates the vehicle; and the preset control error may be understood as an error of a control unit, for example, an error exists when the control unit controls the vehicle to move, thus an error margin of these processing units may be considered to obtain the moving distance, so as to ensure accurate and effective implementation of the avoidance of the first obstacle after the target track point is moved by the corresponding moving distance.

It could be understood that, the target distance in the present embodiment may also be understood as a depth by which the obstacle enters the vehicle traveling area, then actually the moving distance of the target track point is obtained according to the depth by which the obstacle enters the vehicle traveling area and the error margin of respective processing units in the present embodiment.

S610, if the first distance is smaller than or equal to the second distance, determining the moving direction as a direction pointing from the first obstacle to the second side, where the moving direction is perpendicular to the second side.

The moving direction corresponding to the target track point also needs to be determined in the present embodiment. It could be understood that, the moving direction indicates a direction in which the target track point is to be moved, and the purpose of moving is to achieve the obstacle-avoidance of the first obstacle. Then, in general, a distance away from the obstacle needs to be determined as the moving direction.

In a possible implementation, if the first distance is smaller than or equal to the second distance, it is indicated that the first obstacle is closer to the first side of the vehicle traveling area, then in order to avoid the obstacle, the direction pointing from the first obstacle to the second side and perpendicular to the second side may be determined as the moving direction, which, for example, could be understood with reference to FIG. 11.

As shown in FIG. 11, for a vehicle traveling area 1101 currently corresponding to the target track point 3, its first side is 1103 and its second side is 1104. It can be determined based on FIG. 11 that when the first obstacle 1102 is closer to the first side 1103 of the vehicle traveling area 1101, that is, the first distance is currently smaller than the second distance, then the target track point needs to be moved far away from the first obstacle 1102 when being moved currently, to ensure that the obstacle does not exist in the vehicle traveling area after the movement, so a direction A pointing from the first obstacle 1102 to the second side 1104 and perpendicular to the second side 1104 may be determined as the moving direction.

S611, if the first distance is greater than the second distance, determining the moving direction as a direction pointing from the first obstacle to the first side, where the moving direction is perpendicular to the first side.

In another possible implementation, if the first distance is greater than the second distance, it is indicated that the first obstacle is closer to the second side of the vehicle traveling area, then in order to avoid the obstacle, the direction pointing from the first obstacle to the first side and perpendicular to the first side may be determined as the moving direction, which, for example, could be understood with reference to FIG. 12.

As shown in FIG. 12, for a vehicle traveling area 1201 currently corresponding to the target track point 3, its first side is 1203 and its second side is 1204. It can be determined based on FIG. 12 that when the first obstacle 1202 is closer to the second side 1204 of the vehicle traveling area 1201, that is, the first distance is currently greater than the second distance, then the target track point needs to be moved far away from the first obstacle 1202 when being moved currently, to ensure that the obstacle does not exist in the vehicle traveling area after the movement, so a direction B pointing from the first obstacle 1202 to the first side 1203 and perpendicular to the first side 1203 may be determined as the moving direction.

S612, moving the position of the target track point towards the moving direction by the corresponding moving distance to obtain a moved target track point.

After the moving direction and the moving distance are determined, the target track point may be moved. Specifically, the position of the target track point may be moved towards the above determined moving direction by the corresponding moving distance, so as to obtain the moved target track point.

For example, reference can be made to FIG. 13 for understanding. As shown in FIG. 13, assuming that for the track point 3, the determined moving distance is a distance indicated by θ in FIG. 13, and the moving direction is a direction indicated by arrow B in FIG. 13, then the track point 3 can be moved towards the direction indicated by arrow B by the distance θ, so as to obtain the moved target track point 3'.

As shown in FIG. 13, the moved target track point 3' corresponds to an updated vehicle traveling area 1301, where the vehicle traveling area 1301 avoids the obstacle 1302, and the determining way of the vehicle traveling area is similar to that described above and will not be repeated here.

The implementation of moving the position of the target track point in the present embodiment may be commonly understood as: depending on how deep the obstacle enters the vehicle traveling area, then on the basis of this depth, the corresponding error margin is added, and the track point will be moved in the direction away from the obstacle by such distance, so as to realize the obstacle-avoidance.

S613, updating the position of the target track point in the initial traveling route according to the moved target track point.

After respective target track points are moved, the positions of the respective target track points in the initial traveling route can be updated according to the updated target track points, to obtain the updated initial traveling route, and the respective updated target track points are included in the updated initial traveling route.

For example, reference can be made to FIG. 14 for understanding. As shown in FIG. 14, assuming that the initial traveling route is currently the route indicated by 1401 in FIG. 14, a track point 1, a track point 2, a track point 3, a track point 4, a track pointing 5 and a track point 6 are included in the initial traveling route 1401.

Assuming that the track point 3 is the target track point, if the updated track point is the track point indicated by 3' in FIG. 14, then the position corresponding to the target track point 3 in the initial traveling route may be updated to the position shown by the moved target track point 3' to ensure the obstacle avoidance to the obstacle at the target track point 3.

S614, performing, according to the target track point for which the updating processing has been performed and a start track point and an end track point in the initial traveling route, smoothing processing on other track points in the initial traveling route for which the updating processing is not performed, to obtain a target traveling route.

At the same time, in addition to that the position of the target track point is moved in the present embodiment, in order to ensure the vehicle travels smoothly, other track points may also be moved so as to ensure that the traveling route of the vehicle will not be too twisted, resulting in situations such as sharp curves, and thus smooth traveling of the vehicle is ensured.

It could be understood that in the procedure of smoothing processing, the position of the updated target track point and the position of the start track point and the position of the end track point in the initial traveling route will not be changed, so the smoothing processing may be performed on other track points for which the updating processing is not performed in the initial traveling route according to the updated target track point and the start track point and the end track point in the initial traveling route, to obtain the target traveling route, where the smoothing processing is actually to perform translation on the track points which are not updated so as to obtain the target traveling route, and where the updated target track points, the start track point, the end track point and other track points on which the smoothing process has been performed are included in the target traveling route.

In an actual implementation process, the specific implementation of the smoothing processing may be selected according to actual needs, which could be any possible smoothing algorithm and will not be limited by the present embodiment.

For example, reference can be made to FIG. 14 for understanding. In FIG. 14, the track point 3' is the updated target track point, the track point 1 is the start track point, and the track point 6 is the end track point, the positions of these three track points are maintained, and the smoothing processing is performed on other track points. For example, the track point 2 is moved to the position shown by 2' in FIG. 14, and the track point 4 is moved to the position shown by 4' in FIG. 14, to obtain the target traveling route 1402 shown in FIG. 14, and the updated target track point 3', the start track point 1, the end track point 6 and other track points 2', 4' and 5 after the smoothing process is performed are included in the target traveling route 1402.

S615, controlling the vehicle to travel according to the target traveling route.

After the target traveling route is determined, the vehicle can be controlled to travel according to the target traveling route. In the process that the vehicle travels according to the target traveling route, obstacle-avoidance can be implemented effectively, and smooth traveling of the vehicle can be ensured.

According to the route processing method provided by the embodiment of the present disclosure, after the vehicle projection area is expanded in the widthwise direction and the longitudinal direction, the vehicle traveling area is obtained, and then the target track point is determined according to whether an obstacle exists in the vehicle traveling area, so that a certain tolerant distance can be reserved in the actual processing procedure, thereby effectively improving the performance and safety of the obstacle-avoidance processing. At the same time, after the target track point is obtained, the obstacle having the shortest distance to the longitudinal middle axis of the vehicle traveling area corresponding to the target track point is determined as the first obstacle, so that avoidance of all obstacles can be implemented safely and effectively, and at the same time the amount of computation of the obstacle-avoidance is effectively reduced. In addition, the moving direction and the moving distance are determined in the present embodiment, and then the target track point is moved towards the moving direction by the corresponding moving distance, so that obstacle avoidance is implemented easily and effectively, and the amount of computation is very small in this process. At the same time, after the position of the target track point is updated, smoothing processing is performed on the track points in the initial traveling track as well, so as to ensure that the target traveling track finally obtained is a smoothing track, thereby effectively ensuring stability and safety for vehicle traveling.

On the basis of the above embodiment, after the target track point is moved towards the moving direction by the corresponding moving distance, an obstacle in another side corresponding to the moving direction may further be avoided, so as to further ensure safety of obstacle-avoidance processing of the vehicle. The following will further describe the route processing method in detail with reference with FIG. 15 to FIG. 18.

Figure 15:
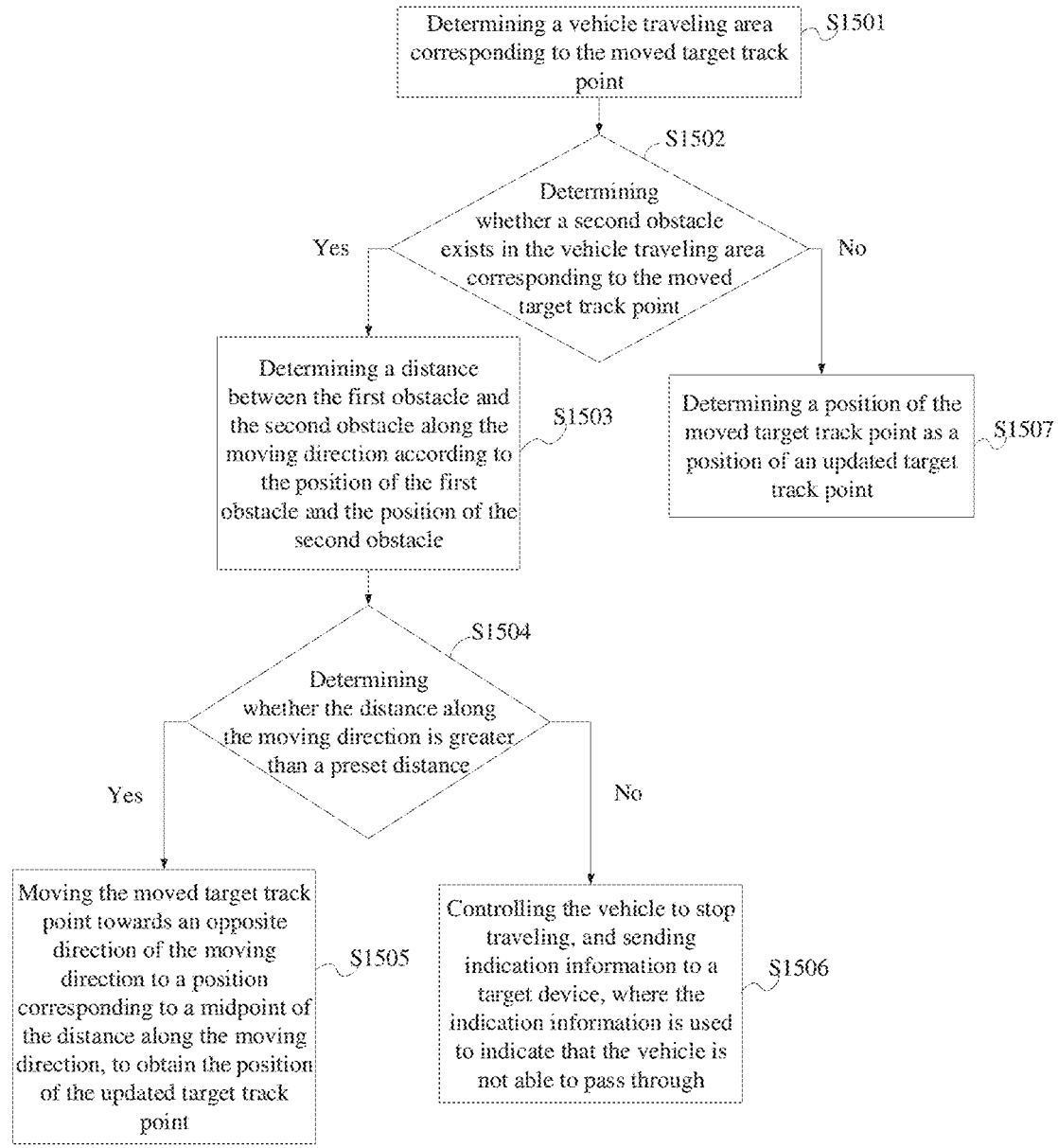
FIG. 15 is a third flowchart of the route processing method provided by an embodiment of the present disclosure.
Figure 16:
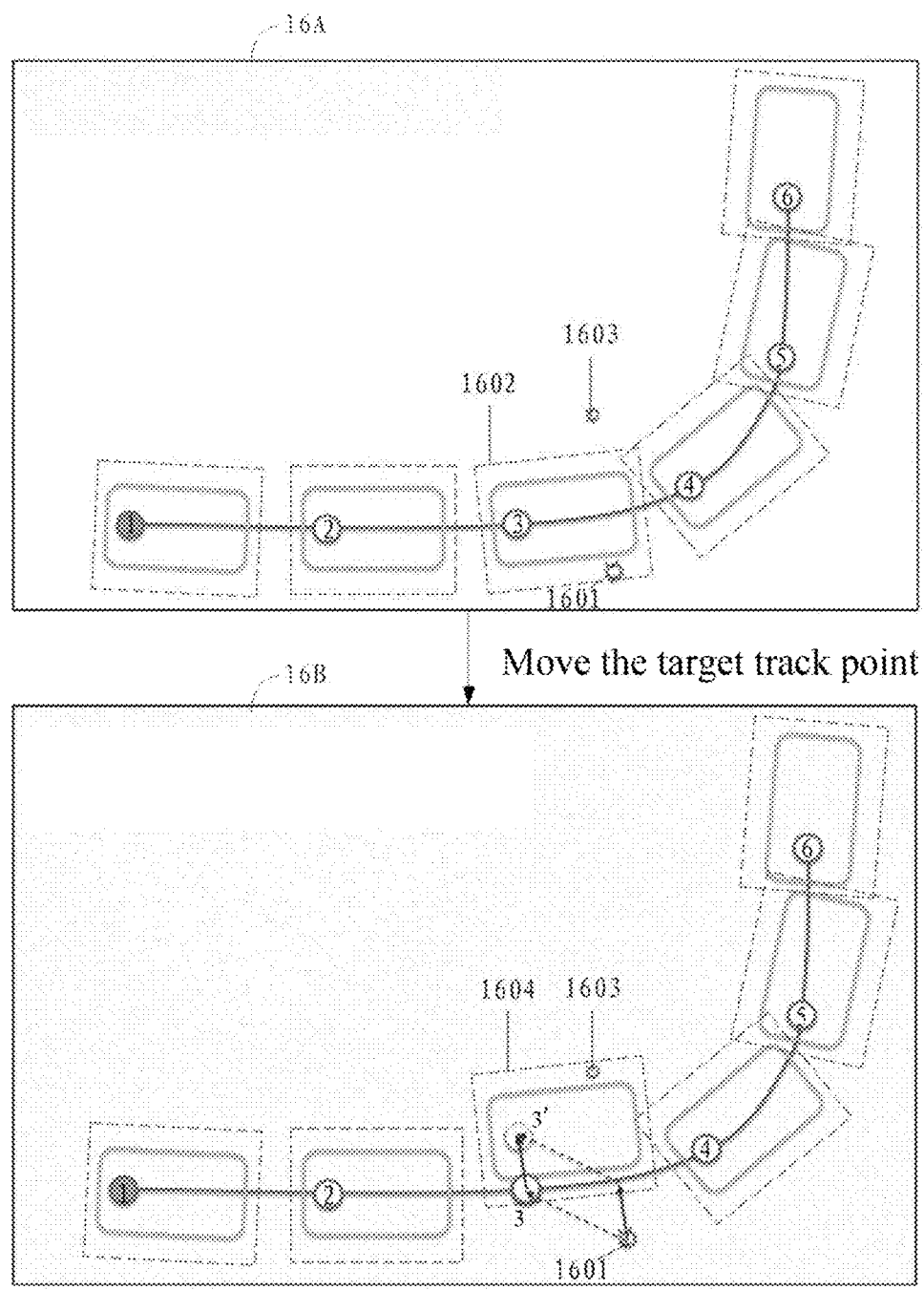
FIG. 16 is a schematic diagram showing that a vehicle traveling area includes a second obstacle provided by an embodiment of the present disclosure.
Figure 17:
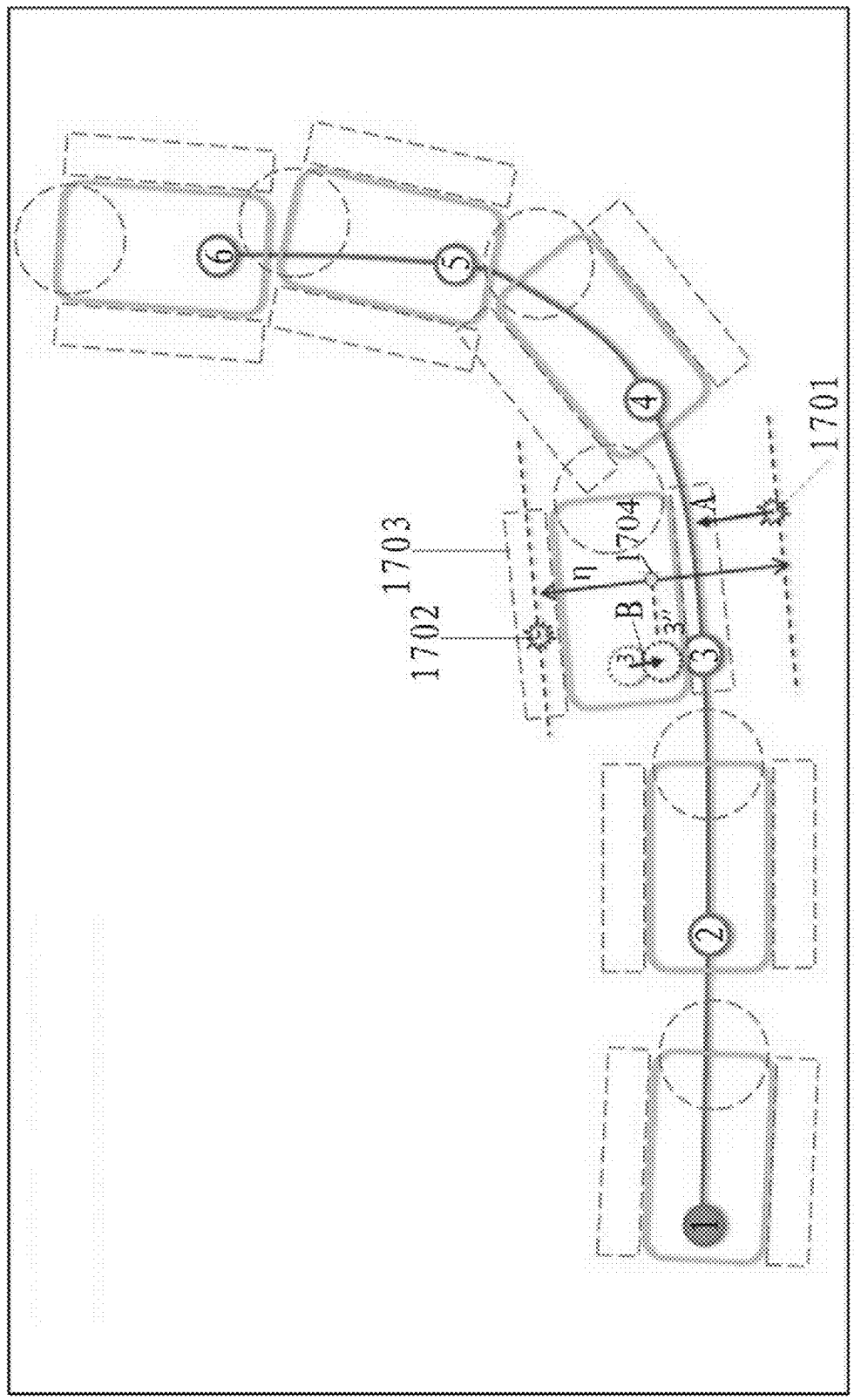
FIG. 17 is a schematic implementation diagram of performing obstacle-avoidance to the second obstacle provided by an embodiment of the present disclosure.
Figure 18:
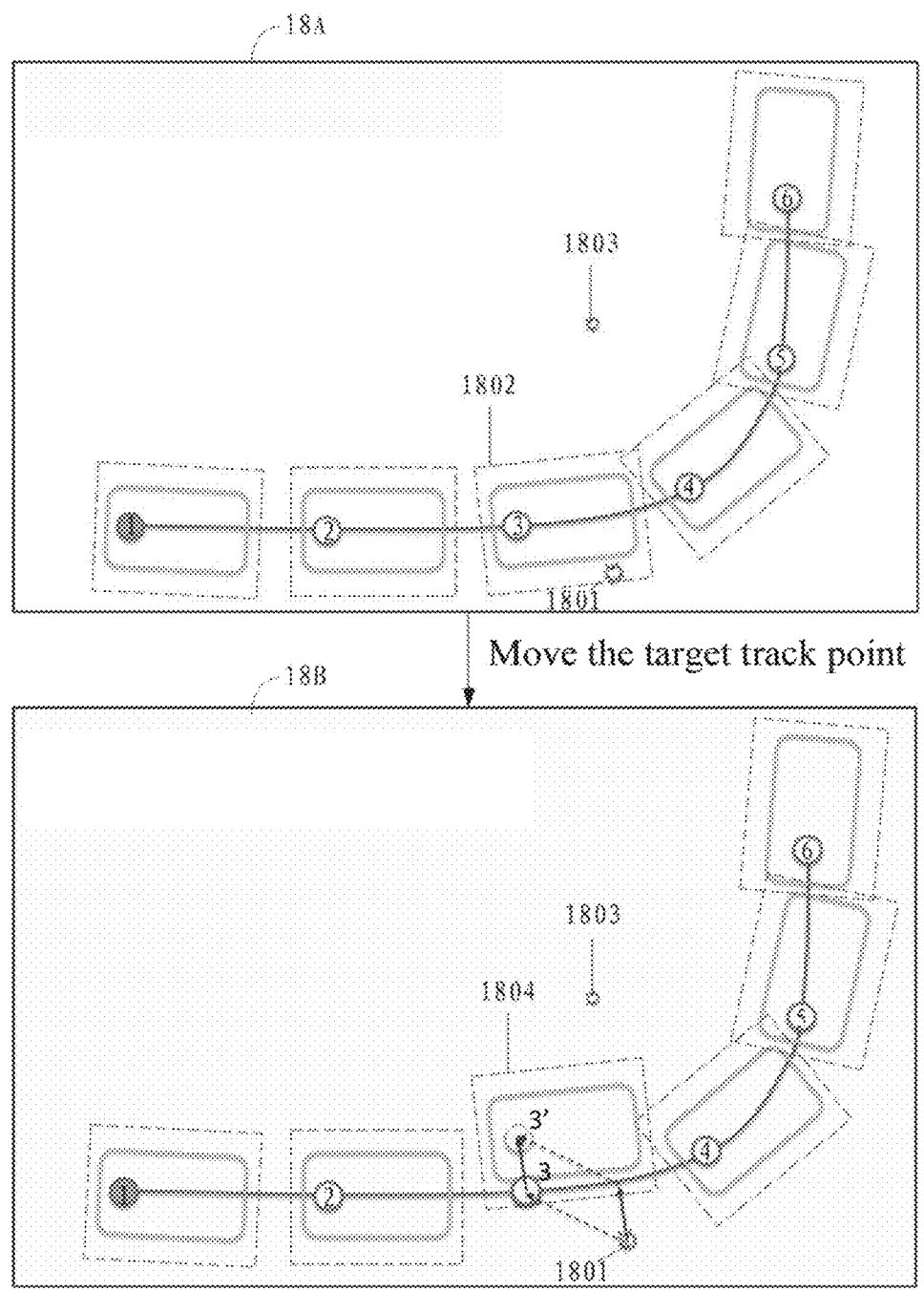
FIG. 18 is a schematic diagram showing that the vehicle traveling area does not include a second obstacle provided by an embodiment of the present disclosure.

FIG. 15 is a third flowchart of the route processing method provided by an embodiment of the present disclosure; FIG. 16 is a schematic diagram showing a vehicle traveling area includes a second obstacle provided by an embodiment of the present disclosure; FIG. 17 is a schematic implementation diagram of performing obstacle-avoidance to the second obstacle provided by an embodiment of the present disclosure; and FIG. 18 is a schematic diagram showing that the vehicle traveling area does not include a second obstacle provided by an embodiment of the present disclosure.

As shown in FIG. 15, the method includes:

S1501, determining a vehicle traveling area corresponding to the moved target track point.

After the target track point is moved, the moved target track point also corresponds to a vehicle traveling area, thus the vehicle traveling area corresponding to the moved target track point may be determined, where the implementation of determining the vehicle traveling area corresponding to the moved target track point is similar to the implementation of determining the vehicle traveling area corresponding to the track point described above, which will not be repeated here.

S1502, determining whether a second obstacle exists in the vehicle traveling area corresponding to the moved target track point, if yes, performing S1503, if no, performing S1507.

It can be determined based on the above description that, after the target track point is moved, avoidance of the first obstacle has actually been implemented, thus the first obstacle does not exist in vehicle traveling area corresponding to the moved target track point.

However, after the target track point is moved towards the moving direction, the corresponding vehicle traveling area is moved as well, thus a new second obstacle may appear in the vehicle traveling area corresponding to the moved target track point, where the concept of the second obstacle is similar to the concept of the above first obstacle, except for that the second obstacle is a different obstacle from the first obstacle.

S1503, determining a distance between the first obstacle and the second obstacle along the moving direction according to the position of the first obstacle and the position of the second obstacle.

In a possible implementation, the second obstacle exists in the vehicle traveling area corresponding to the moved target track point, that is, after the target track point is moved, a new obstacle appears in the vehicle traveling area.

For example, reference can be made to FIG. 16 for understanding. For example, 16A of FIG. 16 represents a state of the target track point before being moved. As shown in FIG. 16, assuming that the track point 3 is currently the target track point, and before the track point 3 is moved, a first obstacle 1601 exists in the vehicle traveling area 1602 corresponding to the target track point 3, and a second obstacle 1603 exists outside the vehicle traveling area. Since the first obstacle 1601 is in the vehicle traveling area 1602, obstacle-avoidance processing needs to be performed to the first obstacle 1601, specifically, the target track point 3 may be moved towards the moving direction by the corresponding moving distance to obtain the moved target track point.

For example, a state of the target track point after being moved can be understood with reference to 16B of FIG. 16. As shown by 16B of FIG. 16, after the target track point 3 is moved by the corresponding distance, the moved target track point 3' is obtained, where the first obstacle 1601 is not included in the vehicle traveling area 1604 corresponding to the target track point 3' anymore, that is, obstacle-avoidance processing to the first obstacle 1601 is implemented.

However, the second obstacle 1603 is included in the vehicle traveling area 1604 corresponding to the target track point 3', that is, after the track point is moved, an obstacle which was not included in the vehicle traveling area is now included in the vehicle traveling area, and obstacle-avoidance processing needs to be performed to the second obstacle on the other side.

In a possible implementation, for example, a distance between the first obstacle and the second obstacle along the moving direction may be determined first according to the position of the first obstacle and the position of the second obstacle.

For example, reference can be made to FIG. 17 for understanding. As shown in FIG. 17, assuming that 1701 in FIG. 17 is the first obstacle, 1702 is the second obstacle, after the target track point 3 is moved towards the moving direction indicated by the arrow A by the corresponding moving distance, the moved target track point 3' is obtained, thereby implementing the avoidance of the first obstacle 1701.

The vehicle traveling area corresponding to the moved target track point 3' is an area indicated by 1703 in FIG. 17. It can be determined with reference to FIG. 17 that, when the vehicle traveling area is obtained by performing expansion to the vehicle projection area indicated by the block of solid lines, rectangular expansion is performed on two sides in the widthwise direction, and circular expansion is performed on one side in the longitudinal direction, so that the vehicle traveling area indicated by dotted lines 1703 in FIG. 17 is obtained.

The vehicle traveling area 1703 is the vehicle traveling area corresponding to the target track point 3'. Referring to FIG. 17, the second obstacle 1702 exists in the vehicle traveling area 1703, and obstacle-avoidance processing needs to be performed to the second obstacle 1702 as well and the distance between the first obstacle 1701 and the second obstacle 1702 along the moving direction A, that is, the distance indicated by 11 in FIG. 17, may be obtained.

S1504, determining whether the distance along the moving direction is greater than a preset distance, if yes, performing S1505, if no, performing S1506.

After the distance between the first obstacle and the second obstacle along the moving direction is determined, the distance along the moving direction may be first compared to the preset distance. The preset distance in the present embodiment is greater than or equal to a width of the vehicle, thus the current determining may be understood as determining whether the distance between the two obstacles along the moving direction is enough for the vehicle to pass through.

S1505, moving the moved target track point towards an opposite direction of the moving direction to a position corresponding to a midpoint of the distance along the moving direction, to obtain the position of the updated target track point.

In a possible implementation, if it is determined that the distance between the first obstacle and the second obstacle along the moving direction is greater than the preset distance, it may be determined that the distance between the first obstacle and the second obstacle is enough for the vehicle to pass through, then to implement the avoidance of the second obstacle, and to ensure the safety of passing through for the two sides, the moved target track point may be moved towards the opposite direction of the above determined moving direction, and such current movement is to move away from the second obstacle.

Specifically, the moved target track point may be moved to the position corresponding to the midpoint of the distance along the moving direction, that is, the target track point is moved to a middle position between the two obstacles, so as to ensure the safety of passing through for the two sides.

For example, reference can be made to FIG. 17 for understanding. As shown in FIG. 17, after the target track point 3 is moved towards the moving direction A by the corresponding moving distance, the moved target track point 3' is obtained. Since the second obstacle 1702 exists in the vehicle traveling area 1703 of the currently determined moved target track point 3', the moved target track point 3' needs to be moved towards the opposite direction of the moving direction A, that is, to be moved towards the direction indicated by arrow B in FIG. 17.

The moved target track point 3' is moved to the position corresponding to the midpoint of the distance between the two obstacles along the moving direction. In FIG. 17, the distance between the two obstacles along the moving direction is the distance indicated by then the midpoint of the distance along the moving direction is the position indicated by 1704 in FIG. 17, then the target track point 3' may be moved towards the direction indicated by arrow B to the position corresponding to the midpoint 1704, so as to obtain the updated target track point 3", of which the position can be understood with reference to FIG. 17.

In the present embodiment, the moved target track point is moved again to the position corresponding to the midpoint of the distance between the two obstacles along the moving direction, so that avoidance of the second obstacle is effectively implemented, and the safety of passing through is ensured for the two sides.

S1506, controlling the vehicle to stop traveling, and sending indication information to a target device, where the indication information is used to indicate that the vehicle is not able to pass through.

In another possible implementation, if the distance between the first obstacle and the second obstacle along the moving direction is smaller than or equal to the preset distance, then the distance between the first obstacle and the second obstacle is not enough for the vehicle to pass through, thus currently no matter how the vehicle adjusts its position, obstacle-avoidance cannot be implemented.

To ensure the safety for vehicle traveling, the vehicle may be currently controlled to stop traveling, and the indication information is sent to the target device, where the indication information is used to indicate that the vehicle is not able to pass through currently.

S1507, determining a position of the moved target track point as a position of an updated target track point.

In another possible implementation, if the second obstacle does not exist in the vehicle traveling area corresponding to the moved target track point, that is, after the target track point is moved, there is no influence of obstacle in the other side, then the moved target track point may be directly determined as the position of the updated target track point, and then the vehicle passes through according to the position of the updated target track point.

For example, reference may be made to FIG. 18 for understanding. For example, 18A of FIG. 18 represents a state of a target track point before being moved. As shown in FIG. 18, assuming that a track point 3 is currently the target track point, and before the track point 3 is moved, a first obstacle 1801 exists in the vehicle traveling area 1802 corresponding to the target track point 3, and a second obstacle 1803 exists outside the vehicle traveling area. Since the first obstacle 1801 exists in the vehicle traveling area 1802, obstacle-avoidance processing needs to be performed to the first obstacle 1801, and specifically, the target track point 3 may be moved towards the moving direction by the corresponding moving distance to obtain the moved target track point.

For example, a state of the target track point after being moved may be understood with reference to 18B of FIG. 18. As shown in 18B of FIG. 18, after the target track point 3 is moved by the corresponding distance, the moved target track point 3' is obtained, where the first obstacle 1801 is not included in the vehicle traveling area 1804 corresponding to the target track point 3' anymore, that is, obstacle-avoidance processing to the first obstacle 1801 has been implemented.

At the same time, the second obstacle 1803 is not included in the vehicle traveling area 1804 corresponding to the target track point 3', that is, no obstacle needs to be avoided in the other side, thus the moved target track point 3' may be directly determined as the updated target track point.

According to the route processing method provided by the present embodiment, after the target track point is moved, the obstacle-avoidance processing is also performed to the second obstacle on the other side of moving, and specifically, the target track point is moved to the position corresponding to the midpoint of the distance between the two obstacles along the moving direction, so that the safety of passing through is ensured for the two sides.

On the basis of the respective embodiments described above, it also needs to be noted that, the route processing method in the embodiments of the present disclosure is performed in real time in a certain frequency, for example, processing is performed in a frequency of 10 frames/second, that is, 10 image frames are acquired per second, and the processing procedure described above is performed for each image frame, to implement real time obstacle-avoidance processing. At the same time, it can be understood that, a position of a static obstacle will not change in each image frame, thus the obstacle-avoidance processing can be effectively implemented; although a position of a dynamic obstacle will change, however, processing is performed according to the position of the obstacle in the image frame in the present embodiment, and thus the dynamic obstacle can be converted into a static obstacle to be processed in real time, and therefore the obstacle-avoidance processing can also be implemented. In an actual implementation process, the specific implementation of the frequency for acquiring the image frames may be selected according to actual needs, which is not limited in the present embodiment.

Figure 19:
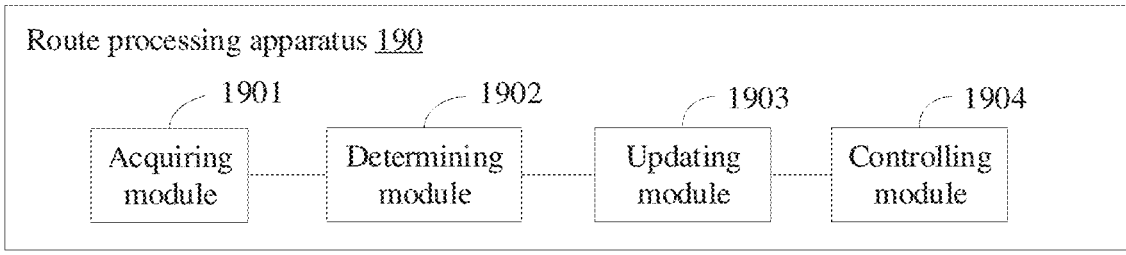
FIG. 19 is a schematic structural diagram of a route processing apparatus provided by an embodiment of the present disclosure.

FIG. 19 is a schematic structural diagram of a route processing apparatus provided by an embodiment of the present disclosure. As shown in FIG. 19, the route processing apparatus 1900 of the present embodiment may include: an acquiring module 1901, a determining module 1902, an updating module 1903 and a controlling module 1904.

The acquiring module 1901 is configured to acquire an initial traveling route corresponding to a vehicle, where the initial traveling route includes a plurality of track points.

The determining module 1902 is configured to determine a vehicle traveling area corresponding to each track point, where the vehicle traveling area includes an area where the vehicle is located when the vehicle travels to the track point.

The determining module 1902 is further configured to determine at least one target track point in the plurality of track points according to the vehicle traveling area corresponding to each track point 1902, where a first obstacle exists in the vehicle traveling area corresponding to the target track point.

The updating module 1903 is configured to perform updating processing on a position of each target point in the initial traveling route respectively according to the position of the at least one target track point and a position of the first obstacle corresponding to each target track point, and to obtain a target traveling route according to the target track point for which the updating processing has been performed.

The controlling module 1904 is configured to control the vehicle to travel according to the target traveling route.

In a possible implementation, for any target track point in the at least one target track point; the updating module 1903 is specifically configured to:

determine a moving direction and a moving distance of the target track point according to a position of the vehicle traveling area and the position of the first obstacle corresponding to the target track point; and update the position of the target track point in the initial traveling route according to the moving direction and the moving distance of the target track point.

In a possible implementation, the updating module 1903 is specifically configured to:

acquire a first distance between the first obstacle and a first side of the vehicle traveling area, and a second distance between the first obstacle and a second side of the vehicle traveling area;

determine a minimum value of the first distance and the second distance as a target distance; and determine a sum of the target distance and preset error information as the moving distance, where the preset error information includes at least one of a preset perception error, a preset positioning error or a preset control error.

In a possible implementation, the updating module 1903 is specifically configured to:

if the first distance is smaller than or equal to the second distance, determine the moving direction as a direction pointing from the first obstacle to the second side, where the moving direction is perpendicular to the second side;

if the first distance is greater than the second distance, determine the moving direction as a direction pointing from the first obstacle to the first side, where the moving direction is perpendicular to the first side.

In a possible implementation, the updating module 1903 is specifically configured to:
move the position of the target track point towards the moving direction by the moving distance to obtain a moved target track point; and
update the position of the target track point in the initial traveling route according to the moved target track point.

In a possible implementation, the updating module 1903 is specifically configured to:
determine a vehicle traveling area corresponding to the moved target track point;
if no second obstacle exists in the vehicle traveling area corresponding to the moved target track point, determine a position of the moved target track point to be a position of an updated target track point;
if a second obstacle exists in the vehicle traveling area corresponding to the moved target track point, update the position of the target track point in the initial traveling route according to the position of the first obstacle and a position of the second obstacle.

In a possible implementation, the updating module 1903 is specifically configured to:
determine a distance between the first obstacle and the second obstacle along the moving direction according to the position of the first obstacle and the position of the second obstacle; and
if the distance along the moving direction is greater than a preset distance, move the moved target track point towards an opposite direction of the moving direction to a position corresponding to a midpoint of the distance along the moving direction, to obtain the position of the updated target track point, where the preset distance is greater than or equal to a width of the vehicle.

In a possible implementation, the controlling module 1904 is further configured to:
if the distance along the moving direction distance is smaller than or equal to the preset distance, control the vehicle to stop traveling, and send indication information to a target device, where the indication information is used to indicate that the vehicle is not able to pass through.

In a possible implementation, the determining module 1902 is specifically configured to:
acquire a head angle corresponding to a track point;
obtain a vehicle projection area corresponding to the track point according to the head angle corresponding to the track point, a position of the track point and a length and the width of the vehicle; and
expand the vehicle projection area along a widthwise direction by a first length, and/or, expand the vehicle projection area along a longitudinal direction by a second length, to obtain the vehicle traveling area corresponding to the track point.

In a possible implementation, the updating module 1903 is specifically configured to:
perform, according to the target track point for which the updating processing has been performed and a start track point and an end track point in the initial traveling route, smoothing processing on other track points in the initial traveling route for which the updating processing is not performed, to obtain the target traveling route;
where the target track point for which the updating processing has been performed, the start track point, the end track point and the other track points on which the smoothing processing has been performed are included in the target traveling route.

In a possible implementation, the determining module 1902 is specifically configured to:
acquire a position of at least one obstacle;
if it is determined, according to the position of the at least one obstacle, that an obstacle exists in a vehicle traveling area corresponding to a track point, determine the track point as the target track point.

In a possible implementation, the determining module 1902 is further configured to:
after the at least one target track point is determined from the plurality of track points, for each target track point, determine, in at least one obstacle included in the vehicle traveling area corresponding to the target track point, an obstacle which has a shortest distance to the longitudinal middle axis of the vehicle traveling area as the first obstacle.

The present disclosure provides a route processing method and apparatus, applied in the field of autonomous driving in the computer technology, to reach the purpose of ensuring that the vehicle implements accurate and safe obstacle-avoidance in the case of limited computing power resource.

According to the embodiments of the present disclosure, the present disclosure further provides an electronic device and a readable storage medium.

According to the embodiments of the present disclosure, the present disclosure further provides a computer program product, where the computer program product includes: a computer program stored in the readable storage medium, where at least one processor of an electronic device may read the computer program from the readable storage medium, and the at least one processor executes the computer program to cause the electronic device to execute the method according to any one of the above embodiments.

Figure 20:
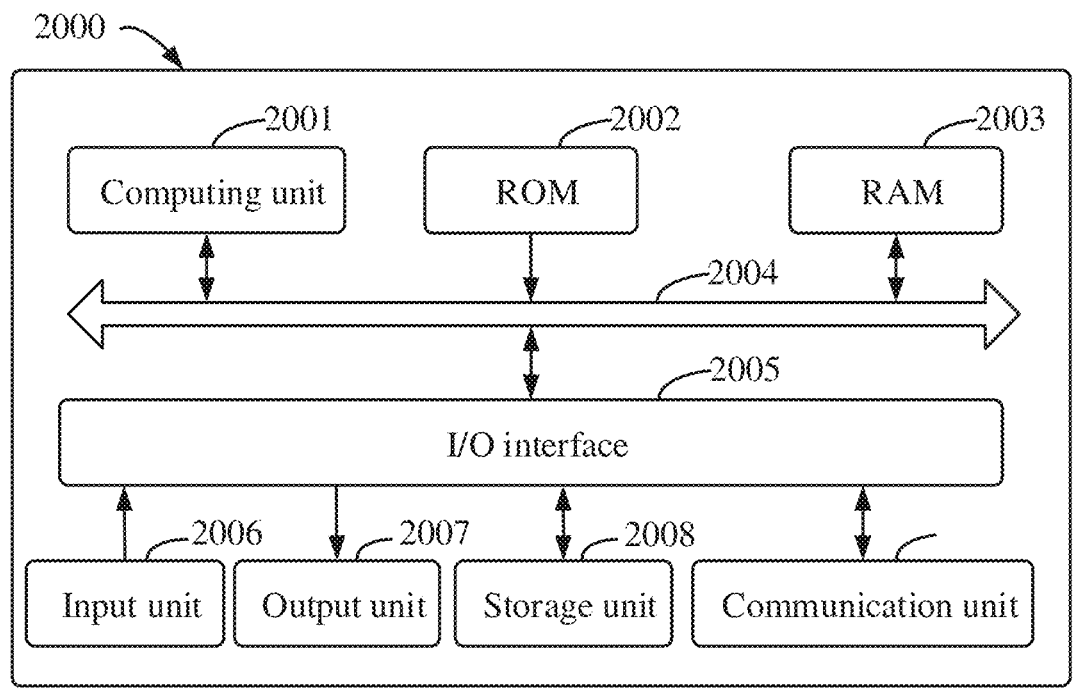
FIG. 20 is a block diagram of an electronic device for implementing the route processing method provided by an embodiment of the present disclosure.

FIG. 20 shows a schematic block diagram of an illustrative electronic device 2000 for implementing the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may also represent various forms of mobile devices, such as a personal digital assistance, a cellular phone, a smart phone, a wearable device and other similar computing devices. The components, their connections and relationships, and their functions shown herein are only examples, and are not intended to limit the implementation of the present disclosure described and/or claimed herein.

As shown in FIG. 20, the electronic device 2000 includes a computing unit 2001, which can perform respective suitable actions and processes according to a computer program stored in a read-only memory (ROM) 2002 or a computer program loaded from a storage unit 2008 to a random access memory (RAM) 2003. In the RAM 2003, various programs and data required for operation of the electronic device 2000 can also be stored. The computing unit 2001, the ROM 2002 and the RAM 2003 are mutually connected by a bus 2004. An input/output (I/O) interface 2005 is also connected to the bus 2004.

Several components in the electronic device 2000 are connected to the I/O interface 2005, including: an input unit 2006, such as a keyboard, a mouse, etc.; an output unit 2007, such as various types of displays, speakers, etc.; a storage unit 2008, such as a magnetic disk, an optical disk, etc.; and a communication unit 2009, such as a network card, a modem, a wireless communication transceiver, etc. The communication unit 2009 allows the electronic device 2000 to exchange information/data with other devices through a computer network such as the Internet and/or various telecommunication networks.

The computing unit 2001 may be various general-purpose and/or special-purpose processing components with processing and computing capabilities. Some examples of the computing unit 2001 include, but are not limited to, a central processing unit (CPU), a graphics processing unit (GPU), various dedicated artificial intelligence (AI) computing chips, various computing units running machine learning model algorithms, a digital signal processor (DSP), and any suitable processor, controller, micro-controller, etc. The computing unit 2001 performs various methods and processing described above, such as the route processing method. For example, in some embodiments, the route processing method may be implemented as a computer software program tangibly included in a machine-readable medium, for example, the storage unit 2008. In some embodiments, part or all of the computer program may be loaded and/or installed on the electronic device 2000 via the ROM 2002 and/or the communication unit 2009. When the computer program is loaded into the RAM 2003 and executed by the computing unit 2001, one or more steps of the route processing method described above can be executed. Alternatively, in other embodiments, the computing unit 2001 may be configured to execute the route processing method by any other suitable means (for example, by means of firmware).

Various embodiments of the systems and technologies described above may be implemented in a digital electronic circuit system, an integrated circuit system, a field programmable gate array (FPGA), an application specific integrated circuit (ASIC), an application specific standard product (ASSP), a system on chip (SOC), a load programmable logic device (CPLD), computer hardware, firmware, software, and/or their combinations. These various embodiments may include: being implemented in one or more computer programs that can be executed and/or interpreted on a programmable system including at least one programmable processor, which can be a dedicated or universal programmable processor that can receive data and instructions from a storage system, at least one input device, and at least one output device and transmit the data and instructions to the storage system, the at least one input device, and the at least one output device.

Program code for implementing the method of the present disclosure may be written in any combination of one or more programming languages. The program code can be provided to a processor or a controller of a general-purpose computer, a special-purpose computer or other programmable data processing apparatus, so that when the program code is executed by the processor or the controller, the functions/operations specified in the flowchart and/or block diagrams are caused to be implemented. The program code can be completely executed on a machine, partially executed on a machine, partially executed on a machine and partially executed on a remote machine as independent software packages or completely executed on a remote machine or server.

In the context of the present disclosure, a machine-readable medium may be a tangible medium that can contain or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, device or equipment, or any suitable combination of the foregoing. More specific examples of machine-readable storage media may include electrical connections based on one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any suitable combination of the above.

To provide interaction with users, the systems and technologies described herein may be implemented on a computer, and the computer includes: a display device (for example, a CRT (cathode ray tube) or LCD (liquid crystal display) monitor) for displaying information to users; and a keyboard and a pointing device (for example, a mouse or a trackball) through which a user can provide input to the computer. Other kinds of devices may also be used to provide interaction with users; for example, the feedback provided to a user may be any form of sensory feedback (for example, visual feedback, auditory feedback, or tactile feedback); and the input from a user may be received in any form (including acoustic input, voice input or tactile input).

The systems and technologies described herein may be implemented in a computing system including a back-end component (for example, as a data server), or a computing system including a middleware component (e.g., an application server), or a computing system including a front-end component (e.g., a user computer with a graphical user interface or a web browser through which users can interact with the implementations of the systems and technologies described herein), or a computing system including a combination of such back-end component, middleware component, or front-end component. The components of the system may be connected to each other by any form or medium of digital data communications (for example, a communication network). Examples of the communication network include: a local area network (LAN), a wide area network (WAN) and the Internet.

The computer system may include a client and a server. The client and the server are generally far away from each other and usually interact through a communication network. The relationship between the client and the server is generated by computer programs running on corresponding computers and having a client-server relationship with each other. The server may be a cloud server, also known as a cloud computing server or a cloud host, which is a host product in the cloud computing service system, in order to solve the defects of difficult management and weak business scalability in the traditional physical host and VPS service ("Virtual Private Server", or "VPS" for short). The server may also be a distributed system server or a server combined with a block chain.

It should be understood that various forms of procedures shown above may be used by reordering, adding or deleting steps. For example, the steps described in the present disclosure may be executed in parallel, in sequence or in a different order, so long as the desired results of the technical solution disclosed in the present disclosure can be achieved, which is not limited here.

The above embodiments do not limit the scope of protection of the present disclosure. Those skilled in the art should understand that various modifications, combinations, sub-combinations and substitutions can be made according to design requirements and other factors. Any modification, equivalent substitution and improvement within the spirit and principle of the present disclosure should be included in the protection scope of the present disclosure.

What is claimed is:

1. A route processing method, comprising:
acquiring an initial traveling route corresponding to a vehicle, wherein the initial traveling route comprises a plurality of track points;
determining a vehicle traveling area corresponding to each track point, wherein the vehicle traveling area comprises an area where the vehicle is located when the vehicle travels to the track point;
determining at least one target track point in the plurality of track points according to the vehicle traveling area corresponding to each track point, wherein a first obstacle exists in the vehicle traveling area corresponding to the target track point;
performing updating processing on a position of each target track point in the initial traveling route respectively according to the position of the at least one target track point and a position of the first obstacle corresponding to each target track point, and obtaining a target traveling route according to the target track point for which the updating processing has been performed; and
controlling the vehicle to travel according to the target traveling route.

2. The method according to claim 1, wherein for any target track point in the at least one target track points, the performing the updating processing on the position of each target track point in the initial traveling route respectively according to the position of the target track point and the position of the first obstacle corresponding to the target track point comprises:
determining a moving direction and a moving distance of the target track point according to a position of the vehicle traveling area and the position of the first obstacle corresponding to the target track point; and
updating the position of the target track point in the initial traveling route according to the moving direction and the moving distance of the target track point.

3. The method according to claim 2, wherein the determining the moving distance of the target track point according to the position of the vehicle traveling area and the position of the first obstacle corresponding to the target track point comprises:
acquiring a first distance between the first obstacle and a first side of the vehicle traveling area, and a second distance between the first obstacle and a second side of the vehicle traveling area;
determining a minimum value of the first distance and the second distance as a target distance; and
determining a sum of the target distance and preset error information as the moving distance, wherein the preset error information comprises at least one of a preset perception error, a preset positioning error or a preset control error.

4. The method according to claim 3, wherein the determining the moving direction of the target track point according to the position of the vehicle traveling area and the position of the first obstacle corresponding to the target track point comprises:
in response to that the first distance is smaller than or equal to the second distance, determining that the moving direction is a direction pointing from the first obstacle to the second side, and the moving direction is perpendicular to the second side; and
in response to that the first distance is greater than the second distance, determining that the moving direction is a direction pointing from the first obstacle to the first side, and the moving direction is perpendicular to the first side.

5. The method according to claim 2, wherein the updating the position of the target track point in the initial traveling route according to the moving direction and the moving distance of the target track point comprises:
moving the position of the target track point towards the moving direction by the moving distance to obtain a moved target track point; and
updating the position of the target track point in the initial traveling route according to the moved target track point.

6. The method according to claim 5, wherein the updating the position of the target track point in the initial traveling route according to the moved target track point comprises:
determining a vehicle traveling area corresponding to the moved target track point;
in response to that no second obstacle exists in the vehicle traveling area corresponding to the moved target track point, determining a position of the moved target track point as a position of an updated target track point; and
in response to that a second obstacle exists in the vehicle traveling area corresponding to the moved target track point, updating the position of the target track point in the initial traveling route according to the position of the first obstacle and a position of the second obstacle.

7. The method according to claim 6, wherein the updating the position of the target track point in the initial traveling route according to the position of the first obstacle and the position of the second obstacle comprises:
determining a distance between the first obstacle and the second obstacle along the moving direction according to the position of the first obstacle and the position of the second obstacle; and
in response to that the distance along the moving direction is greater than a preset distance, moving the moved target track point towards an opposite direction of the moving direction to a position corresponding to a midpoint of the distance along the moving direction, to obtain the position of the updated target track point, wherein the preset distance is greater than or equal to a width of the vehicle.

8. The method according to claim 3, wherein the updating the position of the target track point in the initial traveling route according to the moving direction and the moving distance of the target track point comprises:
moving the position of the target track point towards the moving direction by the moving distance to obtain a moved target track point; and
updating the position of the target track point in the initial traveling route according to the moved target track point.

9. The method according to claim 8, wherein the updating the position of the target track point in the initial traveling route according to the moved target track point comprises:
determining a vehicle traveling area corresponding to the moved target track point;
in response to that no second obstacle exists in the vehicle traveling area corresponding to the moved target track point, determining a position of the moved target track point as a position of an updated target track point; and in response to that a second obstacle exists in the vehicle traveling area corresponding to the moved target track point, updating the position of the target track point in the initial traveling route according to the position of the first obstacle and a position of the second obstacle.

10. The method according to claim 9, wherein the updating the position of the target track point in the initial traveling route according to the position of the first obstacle and the position of the second obstacle comprises:
determining a distance between the first obstacle and the second obstacle along the moving direction according to the position of the first obstacle and the position of the second obstacle; and
in response to that the distance along the moving direction is greater than a preset distance, moving the moved target track point towards an opposite direction of the moving direction to a position corresponding to a midpoint of the distance along the moving direction, to obtain the position of the updated target track point, wherein the preset distance is greater than or equal to a width of the vehicle.

11. The method according to claim 4, wherein the updating the position of the target track point in the initial traveling route according to the moving direction and the moving distance of the target track point comprises:
moving the position of the target track point towards the moving direction by the moving distance to obtain a moved target track point; and
updating the position of the target track point in the initial traveling route according to the moved target track point.

12. The method according to claim 11, wherein the updating the position of the target track point in the initial traveling route according to the moved target track point comprises:
determining a vehicle traveling area corresponding to the moved target track point;
in response to that no second obstacle exists in the vehicle traveling area corresponding to the moved target track point, determining a position of the moved target track point as a position of an updated target track point; and
in response to that a second obstacle exists in the vehicle traveling area corresponding to the moved target track point, updating the position of the target track point in the initial traveling route according to the position of the first obstacle and a position of the second obstacle.

13. The method according to claim 12, wherein the updating the position of the target track point in the initial traveling route according to the position of the first obstacle and the position of the second obstacle comprises:
determining a distance between the first obstacle and the second obstacle along the moving direction according to the position of the first obstacle and the position of the second obstacle; and
in response to that the distance along the moving direction is greater than a preset distance, moving the moved target track point towards an opposite direction of the moving direction to a position corresponding to a midpoint of the distance along the moving direction, to obtain the position of the updated target track point, wherein the preset distance is greater than or equal to a width of the vehicle.

14. The method according to claim 7, further comprising:
in response to that the distance along the moving direction is smaller than or equal to the preset distance, controlling the vehicle to stop traveling, and sending indication information to a target device, wherein the indication information is used to indicate that the vehicle is not able to pass through.

15. The method according to claim 2, wherein the determining the vehicle traveling area corresponding to each track point comprises:
acquiring a head angle corresponding to the track point;
obtaining a vehicle projection area corresponding to the track point according to the head angle corresponding to the track point, a position of the track point and a length and the width of the vehicle; and
expanding the vehicle projection area in at least one of the following ways: expanding the vehicle projection area along a widthwise direction by a first length, or, expanding the vehicle projection area along a longitudinal direction by a second length, to obtain the vehicle traveling area corresponding to the track point.

16. The method according to claim 1, wherein the obtaining the target traveling route according to the target track point for which the updating processing has been performed comprises:
performing, according to the target track point for which the updating processing has been performed and a start track point and an end track point in the initial traveling route, smoothing processing on other track points for which the updating processing is not performed in the initial traveling route to obtain the target traveling route;
wherein the target track point for which the updating processing has been performed, the start track point, the end track point and the other track points on which the smoothing processing has been performed are comprised in the target traveling route.

17. The method according to claim 1, wherein the determining at least one target track point in the plurality of track points according to the vehicle traveling area corresponding to each track point comprises:
acquiring a position of at least one obstacle; and
in response to that it is determined, according to the position of the at least one obstacle, that an obstacle exists in a vehicle traveling area corresponding to a track point, determining the track point as the target track point.

18. The method according to claim 17, further comprising:
for each target track point, determining, in at least one obstacle comprised in the vehicle traveling area corresponding to the target track point, an obstacle that has a shortest distance to a longitudinal middle axis of the vehicle traveling area as the first obstacle.

19. A route processing apparatus, comprising:
at least one processor; and
a memory communicatively connected to the at least one processor; wherein
the memory stores an instruction executable by the at least one processor, and the instruction is executed by the at least one processor to cause the at least one processor to:
acquire an initial traveling route corresponding to a vehicle, wherein the initial traveling route comprises a plurality of track points;
determine a vehicle traveling area corresponding to each track point, wherein the vehicle traveling area comprises an area where the vehicle is located when the vehicle travels to the track point;
determine at least one target track point in the plurality of track points according to the vehicle traveling area corresponding to each track point, wherein a first obstacle exists in the vehicle traveling area corresponding to the target track point;

perform updating processing on a position of each target track point in the initial traveling route respectively according to the position of the at least one target track point and a position of the first obstacle corresponding to each target track point, and obtain a target traveling route according to the target track point for which the updating processing has been performed; and control the vehicle to travel according to the target traveling route.

20. A non-transitory computer-readable storage medium storing a computer instruction, wherein the computer instruction is used to cause a computer to:

acquire an initial traveling route corresponding to a vehicle, wherein the initial traveling route comprises a plurality of track points;

determine a vehicle traveling area corresponding to each track point, wherein the vehicle traveling area comprises an area where the vehicle is located when the vehicle travels to the track point;

determine at least one target track point in the plurality of track points according to the vehicle traveling area corresponding to each track point, wherein a first obstacle exists in the vehicle traveling area corresponding to the target track point;

perform updating processing on a position of each target track point in the initial traveling route respectively according to the position of the at least one target track point and a position of the first obstacle corresponding to each target track point, and obtain a target traveling route according to the target track point for which the updating processing has been performed; and control the vehicle to travel according to the target traveling route.

* * * * *